US006304436B1

(12) United States Patent
Branch et al.

(10) Patent No.: US 6,304,436 B1
(45) Date of Patent: Oct. 16, 2001

(54) CONNECTOR SYSTEM WITH OUTWARDLY OPENING DOOR FOR A REMOVABLE TRANSCEIVER MODULE

(75) Inventors: Scott Michael Branch; David Peter Gaio; Michael Francis Hanley; William K. Hogan; Paul John Sendelbach, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/454,919

(22) Filed: Dec. 3, 1999

(51) Int. Cl.[7] ....................................................... H05K 5/00
(52) U.S. Cl. ............................ 361/683; 361/753; 439/135
(58) Field of Search ................................... 361/732, 683, 361/752, 756, 753, 799, 800; 439/135, 136, 142, 297, 607

(56) References Cited

U.S. PATENT DOCUMENTS

| 5,767,999 | 6/1998 | Kayner ................................. 359/163 |
| 5,879,173 | 3/1999 | Poplawski et al. ................... 438/138 |
| 6,062,893 | * 5/2000 | Miskin et al. ........................ 439/374 |

OTHER PUBLICATIONS

Co–pending patent application "Removable Latch and Bezel EMI Grounding Feature for Fiber–Optic Transceivers", Application Serial No. 09/410,786, Filed Oct. 1, 1999.
Co–pending patent application "Guide Rail and CAM System with Integrated Lock–Down and Kick–Out Spring for SMT Connector for Pluggable Modules", Application Serial No. 09/391,974, Filed Sep. 8, 1999.
Co–pending patent application "Guide Rail and CAM System with Integrated Connector for Removable Transceiver", Application Serial No. 09/216,104, Filed Dec. 18, 1998.
Co–pending patent application "Guide Rail System with Integrated Wedge Connector for Removable Transceiver", Application Serial No. 09/215,977, Filed Dec. 18, 1998.

* cited by examiner

Primary Examiner—Tulsidas Patel
(74) Attorney, Agent, or Firm—Matthew J. Bussan; Leslie J. Payne

(57) ABSTRACT

A connector system for a removable transceiver module that interfaces with an electronic device, such as a computer, switch, subsystem, peripheral device, disk drive, tape drive and other input/output devices. The electronic device includes an enclosure having a bezel that has an opening for receiving the module. A circuit board is mounted within the enclosure. A guide member is mounted on the circuit board and is elongated between first and second ends along a first axis. A connector block is located at the first end of the guide member, while a door is pivotally mounted at the second end of the guide member. The module is slidably engageable with the guide member in a direction along the first axis. The module also includes electrical contacts electrically connectable with corresponding electrical contacts in the connector block. The door is pivotable between an open position exposing the opening in the bezel and a closed position where a portion of the door outside the enclosure covers the opening. The door effectively minimizes the likelihood of dust entering the electronic device. Preferably, to provide effective EMI shielding, the door and the bezel each comprise an electrically conductive material and are configured to make electrical contact with each other when said door is closed. The door may be positively latched in the closed position and spring biased toward the open position. The door preferably includes features for guiding and latching the module.

27 Claims, 25 Drawing Sheets

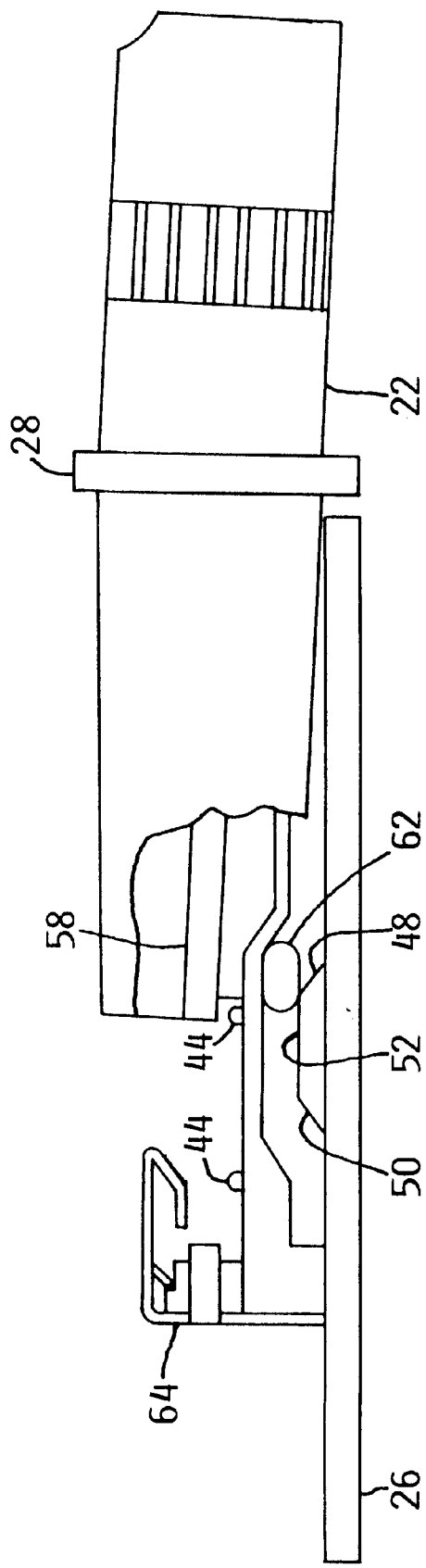

CONNECTOR SYSTEM WITH OUTWARDLY OPENING DOOR FOR A REMOVABLE TRANSCEIVER MODULE

CROSS-REFERENCE TO RELATED APPLICATIONS

Application Ser. No. 09/410,786, filed Oct. 1, 1999, entitled "REMOVABLE LATCH AND BEZEL EMI GROUNDING FEATURE FOR FIBER-OPTIC TRANSCEIVERS"; application Ser. No. 09/391,974, filed Sep. 8, 1999, entitled "GUIDE RAIL AND CAM SYSTEM WITH INTEGRATED LOCK-DOWN AND KICK-OUT SPRING FOR SMT CONNECTOR FOR PLUGGABLE MODULES"; application Ser. No. 09/216,104, filed Dec. 18, 1998, entitled "GUIDE RAIL AND CAM SYSTEM WITH INTEGRATED CONNECTOR FOR REMOVABLE TRANSCEIVER"; and application Ser. No. 09/215,977, filed Dec. 18, 1998, now U.S. Pat. No. 5,980,324 entitled "GUIDE RAIL SYSTEM WITH INTEGRATED WEDGE CONNECTOR FOR REMOVABLE TRANSCEIVER"; are related and are incorporated herein in their entireties by this reference.

BACKGROUND OF THE INVENTION

The present invention relates generally to electronic connector systems and, more specifically, to low-profile connector systems for user-removable electronic modules, such as transceiver modules that interface with an electronic device, such as a computer, switch, subsystem, peripheral device, disk drive, tape drive and other input/output devices.

Electrical connectors are used to interconnect circuit cards and other electronic modules or assemblies in computers and other electronic devices. Various international and industry standards define the type of connectors used to interface computers or other devices to external communication devices such as modems, network interfaces, and other transceivers. A well-known type of transceiver developed by an industry consortium and known as a gigabit interface converter (GBIC) or serial optical converter (SOC) provides an interface between a computer or other electronic device and an Ethernet, Fibre Channel or other data communication environment. In co-pending U.S. patent application Ser. No. 09/216,104, a connector system is described that includes an optoelectronic transceiver module of this type that conforms to the Small Form Factor (SFF) standard. The SFF standard specifies a module enclosure 9.8 mm in height by 13.5 mm in width and allowing a minimum of 24 transceivers across a standard rack opening. The connector system includes a connector that is mountable on a circuit card of a computer or other electronic device and with which the transceiver module can be removably joined for electrical connection. The connector has a guide rail and cam system that facilitates mechanical mating with the transceiver module. The connector can be mounted on a circuit card behind a bezel of the enclosure of the computer or other electronic device, with the guide rail extending through an opening in the bezel. The connector further has a connector block with an array of electrical contacts that facilitate electrical connection with complementary contacts of the transceiver module. A user electrically connects the transceiver module with the connector by sliding the module over the end of the guide rail that protrudes through the bezel, and sliding it along the guide rail until the cam fully engages the transceiver module and fill mechanical and electrical contact is established. At approximately the point at which the transceiver module becomes fully engaged with the connector, a latch member at the distal end of the guide rail engages a complementary latch member on the module.

Because the guide rail of the above-described connector system protrudes through the opening in the bezel, the latch member at its distal end is subject to being inadvertently bumped or jarred especially when the communication port is left open, i.e., no transceiver module is installed in the opening in the bezel. If the force of such an impact is severe enough, it could damage the latch or guide rail or damage the integrity of the soldered electrical connections between the guide rail and the circuit board upon which it is mounted.

In co-pending U.S. patent application Ser. No. 09/410,786, a connector system is described that includes a guide rail with a removable latch member at its distal end that snaps off if it experiences a jarring force to prevent damage. A snap engagement portion on the removable latch member mates with a mating snap engagement portion on the distal end of the guide rail. If the removable latch member snaps off, one can reattach it by snapping it back onto the guide rail. The removable latch member does not, however, address other problems that occur when the communication port is left open. One problem that is not addressed by the removable latch member is the escape of electromagnetic emissions from the computer or other electronic device through the open port. The escape of electromagnetic emissions may cause electromagnetic interference (EMI). Another problem not addressed by the removable latch member is the entry of dust into the computer or other electronic device through the open port.

It is known that an inwardly opening, metal door pivotally mounted within the computer or other electronic device may be used to reduce electromagnetic emissions and dust entry when no transceiver module is installed in the opening in the bezel. U.S. Pat. No. 5,767,999, issued Jun. 16, 1998 to Andrew H. Kayner and U.S. Pat. No. 5,879,173, issued Mar. 9, 1999 to Daniel S. Poplawski et al., for example, each disclose a door within the computer or other electronic device that is spring biased toward a closed position against the bezel. The door opens inwardly toward the inside of the computer or other electronic device as the removable transceiver module is inserted in the opening in the bezel. The bezel is made of metal and grounded by connection to the chassis of the computer or other electronic device. Because the door is made of metal and spring biased against the bezel when no transceiver module is installed in the opening in the bezel, the door serves to reduce electromagnetic emissions. The spring, however, does not always completely close the door when the removable transceiver module is absent. Sources of incomplete door closure include component failure, frictional variations, and spring force variations and deterioration. Incomplete door closure may result in the entry of dust into the computer or other electronic device and the escape of electromagnetic emission, especially at high frequencies. As electronic devices move to higher and higher frequencies of operation, incomplete door closure becomes more problematic. In addition, because the door is mounted within the computer or electronic device, it is difficult to replace or repair components thereof without opening the enclosure of the computer or electronic device. This likely necessitates turning off the computer or electronic device, thereby reducing its availability.

It would be desirable to minimize the likelihood of the above-described damage occurring to the latch member and effectively minimize the likelihood of the above-described escape of electromagnetic emission and entry of dust.

SUMMARY OF THE INVENTION

The present invention addresses the problems described above and others by using an outwardly opening door in a connector system for a removable electronic module, such as a removable transceiver module, that interfaces with a computer or other electronic device. The computer or other electronic device includes an enclosure having a bezel that has an opening for receiving the module. A circuit board is mounted within the enclosure. A guide member is mounted on the circuit board and is elongated between first and second ends along a first axis and having a width along a second axis perpendicular to the first axis. A connector block is located at the first end of the guide member, while the door is pivotally mounted at the second end of the guide member. The module is slidably engageable with the guide member in a direction along the first axis. The module also includes electrical contacts electrically connectable with corresponding electrical contacts in the connector block. The door is pivotable between an open position exposing the opening in the bezel and a closed position where a portion of the door outside the enclosure covers the opening.

In accordance with another aspect of the invention, the door and the bezel each comprise an electrically conductive material and are configured to make electrical contact with each other when said door is closed. Preferably, the door is positively latched in the closed position and spring biased toward the open position. Because the door is positively latched in the closed position, rather than merely being biased toward the closed position, it effectively minimizes the likelihood of electromagnetic emissions escaping from the computer or other electronic device. In addition to providing effective EMI shielding, the door effectively minimizes the likelihood of dust entering the computer or other electronic device. The door may also be configured to make electrical contact when in the closed position with the end of a metal strip at the second end of the guide member and extending along the guide member. Preferably, the bezel and the metal strip are connected to the ground of the computer or other electronic device.

In accordance with yet another aspect of the invention, the door includes features for guiding and latching the module. For example, the door may include a plurality of fingers that make electrical contact with the bezel when said door is closed, and are positioned to guide a module when said door is open. The door may also include a guide rail aligned with a corresponding guide rail formed in the guide member when the door is in the open position. The guide rail on the door may include a late engagement feature that engages a flange on the module when insertion of the module into the bezel opening is complete. Also, the surface of the door may also have a recess mateable with a correspondingly shaped latch member of the module when insertion of the module is complete.

In accordance with still another aspect of the invention, the door has a pair of hinge pins extending along the second axis. The guide member has a pair of hinge pin retention features mateable with the pair of hinge pins. The pair of hinge pins on the door snap into the pair of hinge pin retention features on the guide member to define a snap engagement. The snap engagement releases the door from the guide member if the door is bumped or jarred to minimize the likelihood of damaging it. Also, because the snap engagement is accessible from outside the enclosure computer or other electronic device, repair or replacement of the door may be readily accomplished without opening the enclosure. Thus, it is unnecessary to turn off the computer or electronic device to repair or replace the door, thereby increasing availability.

In an exemplary embodiment of the invention, the guide member is definable by three mutually perpendicular axes and includes a connector block at the proximal end of the guide member, which is elongated in the direction of the first axis and has a width extending along the second axis. The connector block retains electrical contacts, which are spaced from one another in the direction of the first axis. The electrical contacts of the connector block may be arrayed in two or more rows, each parallel to the second axis and having two or more contacts. The guide member, including the connector block, has a very low profile, and in certain exemplary embodiments it is preferably less than about 10 mm in height, i.e., the dimension defined by the third axis, to accommodate the Small Form Factor standard and to facilitate surface-mounting the bottom of guide member on the circuit board. The guide member also includes a cam that, in response to a force of the module being moved along the guide member, redirects the force in a direction having a component along the third axis so as to cause relative motion and resulting electrical contact between the electrical contacts of a connector of the module and the electrical contacts of the connector block.

Prior to insertion of the module, the door is unlatched and moved under spring bias from the closed position to the open position. When the module, guided by the features on the door and guide member, is moved into initial engagement with the cam, the first ramp lifts the module, including the electrical contacts of its connector, above the connector block. When the module is moved further into engagement with the cam, the second ramp lowers the module connector onto the connector block, with the electrical contacts of the module connector lowering onto and making contact with the electrical contacts of the connector block. Simultaneously with the completion of the insertion of the module, a recess on the surface of the door mates with a correspondingly shaped latch member of the module to latch the module in place.

The module can be removed by depressing the door to remove the latch member of the module from the recess on the surface of the door. The module can then be slid out of the computer or other electronic device. The mating parts disengage and electrical contact is broken in the reverse manner from that described above. Once the module is removed, the door can be pushed against the spring bias from the open position to the closed position where the door is latched.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 9B is similar to FIG. 9A and illustrates further progression in the engaging action.

DETAILED DESCRIPTION OF THE PREFERRED EMBODIMENTS

Figure 1:
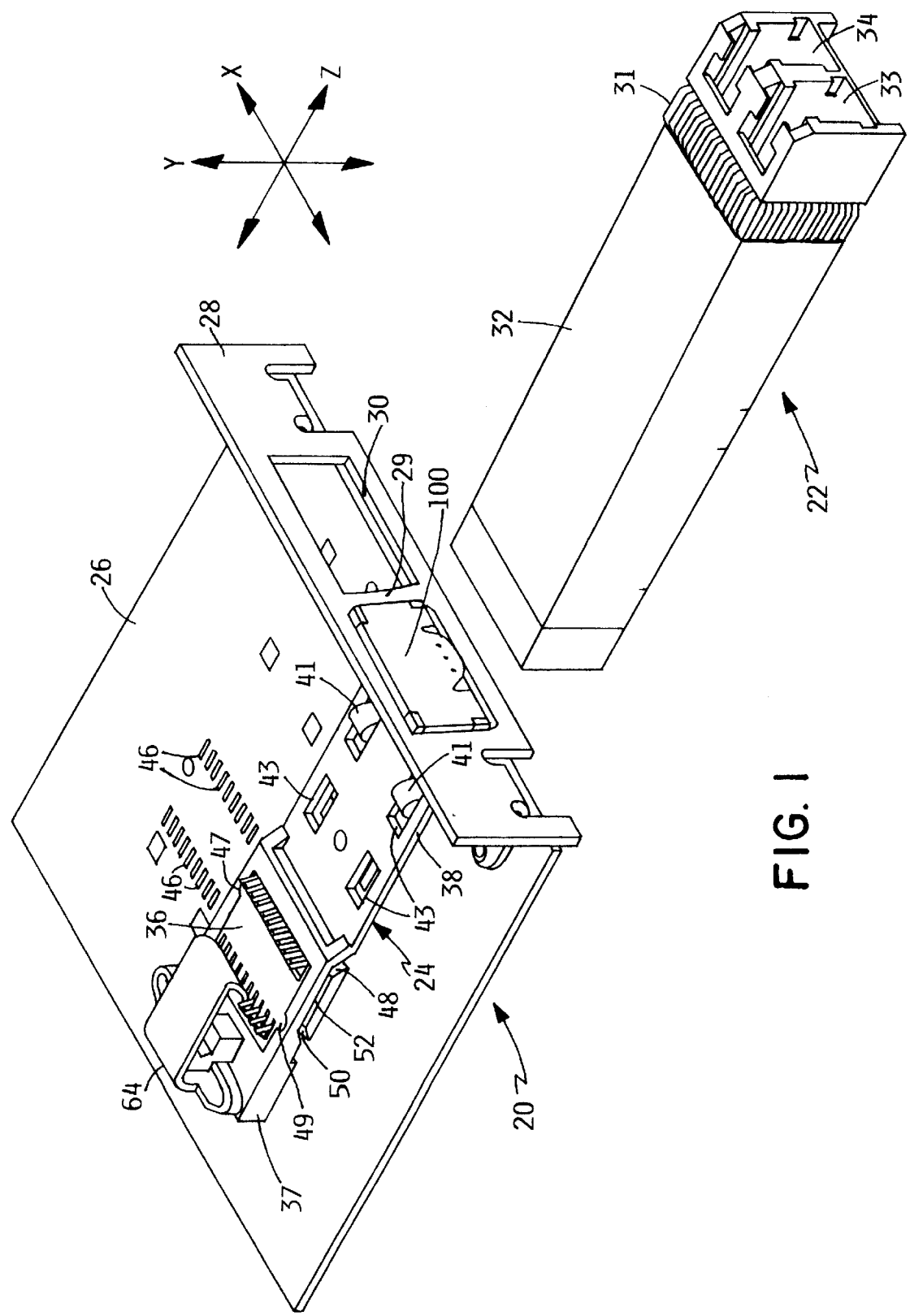
FIG. 1 is a perspective view of a connector system according to a first embodiment of the present invention, showing a peripheral device port assembly having a camming electrical connector engageable with a removable transceiver module.
Figure 2:
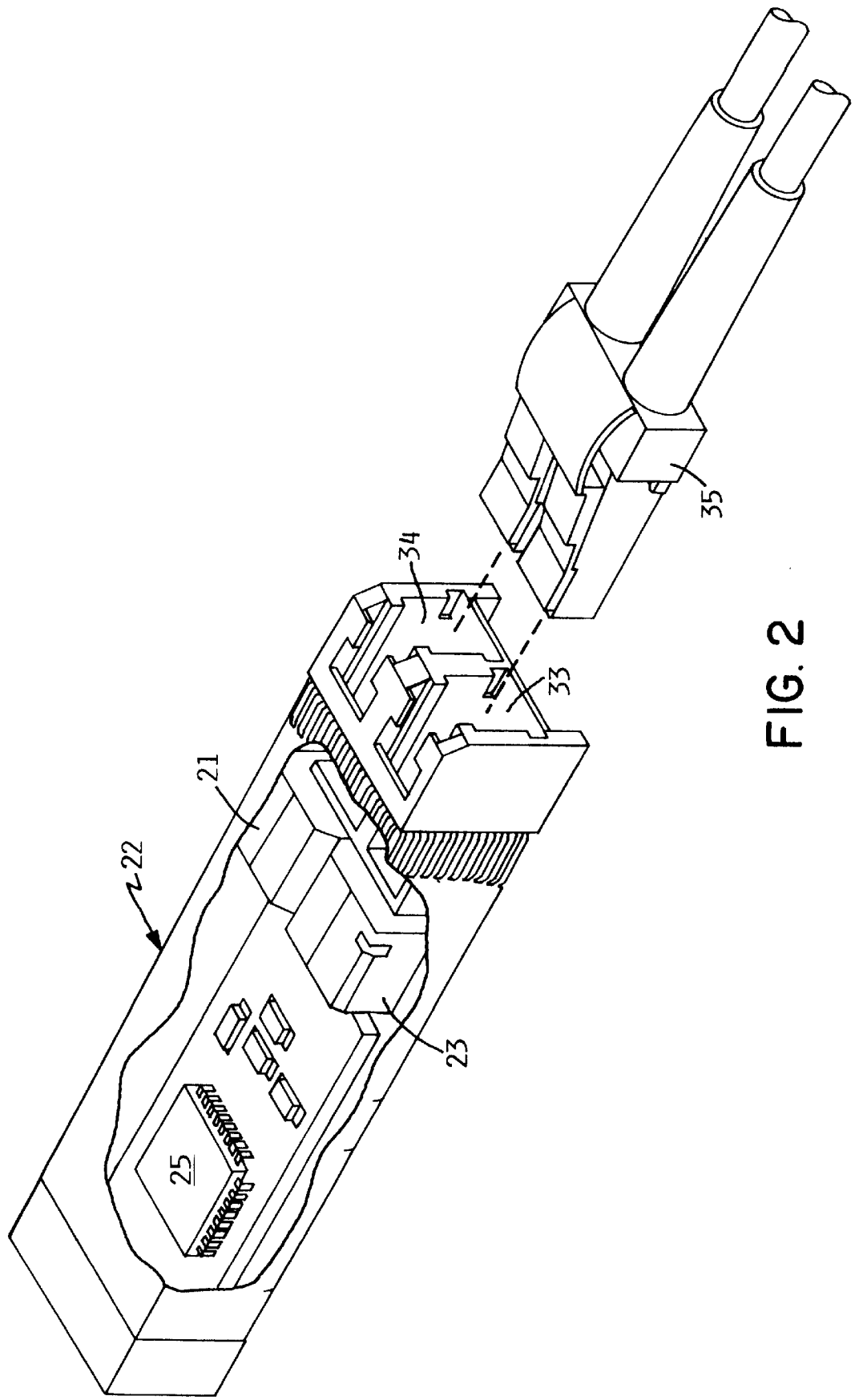
FIG. 2 is a perspective view of the module shown in FIG. 1, partially cut away to show the transceiver circuitry, and illustrating the module mating with an optical cable connector assembly.

As illustrated in FIG. 1, a peripheral device port assembly 20 of an electronic device (not shown), such as a computer, switch, subsystem, peripheral device, disk drive, tape drive and other input/output devices, is electrically and mechanically connectable with an electronic module, such as removable transceiver module 22. Transceiver module 22 is preferably a SFF version of the GBIC or SOC type and, as illustrated in FIG. 2, includes suitable optical transceiver electronics, such as a laser photodiode-based transmitter 21, a photodetector-based receiver 23, and suitable integrated circuit chips 25 that contain laser driver preamplifiers and other circuitry of the type conventionally included in optoelectronic transceivers. Module 22 receives and transmits serial optical data and serial electrical data, although parallel optical and/or parallel electrical transmission and reception is also contemplated within the realm of this invention. Module 22 communicates electrical signals to and from peripheral device port assembly 20 using the electrical connector system described below.

Assembly 20 includes a camming electrical connector 24 surface-mounted as described in further detail below on a printed circuit board 26. A spring clip 64 is also surface-mounted on circuit board 26. Assembly 20 also includes a bracket or bezel 28 mounted perpendicularly to circuit board 26. Preferably, bezel 28 is made of metal and connected to the ground of the computer or other electronic device. Alternatively, bezel 28 may be metalized or include a metal cover. Bezel 28 has rectangular openings 30 (only one opening can be seen in FIG. 1, the other opening is covered by a door 100 described below) with substantially industry-standard dimensions and is capable of receiving transceiver module 22 having the PCMCIA standard height of 9.8 mm (maximum). Preferably, the dimensions are 14.3 mm by 10.2 mm. In use, assembly 20 can be mounted in an orientation with bezel 28 parallel to and abutting a wall of a computer enclosure having a correspondingly dimensioned opening. Because the novel connector system of the present invention is electronically engageable through an enclosure opening 30 having standard PCMCIA dimensions and a septum 29, connector 24 of the system can be mounted on an essentially standard peripheral device port assembly 20. In other words, computer device manufacturers can readily adapt their existing assemblies of this type to include the novel connector system of the present invention in place of conventional connector systems, such as those that use D-shell connectors.

A particular advantage of the connector system of the present invention is that module 22 can conform to the SFF standard. In accordance with the SFF standard, module 22 preferably has an enclosure 32 that is less than 9.8 mm in height and 13.5 mm in width. As used in this patent specification, the term "width" refers to the dimension or axis labeled "X" in FIG. 1, and the term "height" refers to the dimension or axis labeled "Y" in FIG. 1. In view of the increasing desire in the industry to miniaturize communication transceivers in order to increase port density, it has been suggested that newer transceivers that conform to the SFF standard have connectors that resemble a standard RJ45 telephone jack, which is less than 13.5 mm wide. Module 22 has optical input and output connectors 33 and 34 that, as illustrated in FIG. 2, are optically and mechanically mateable with an optical cable connector assembly 35. Module 22 thus receives serial optical signals at one end from optical cable connector assembly 35, converts them to electrical signals, and provides the electrical signals to assembly 20. Likewise, module 22 receives serial electrical signals from assembly 20, converts them to optical signals, and provides the optical signals at the other end to optical cable connector assembly 35. Although FIGS. 1 and 2 illustrate a LC SFF optical connector, other SFF optical connectors such as the MT-RJ or VF-45 can alternatively be used.

Figure 3:
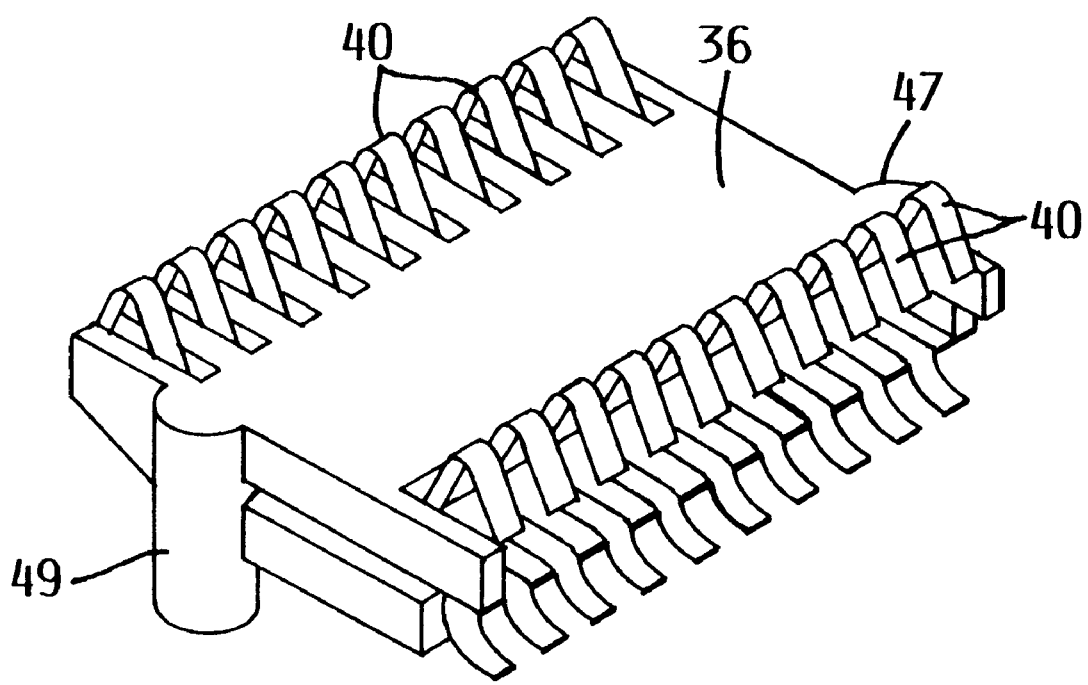
FIG. 3 is a perspective view of the connector block portion of the camming electrical connector shown in FIG. 1.
Figure 4:
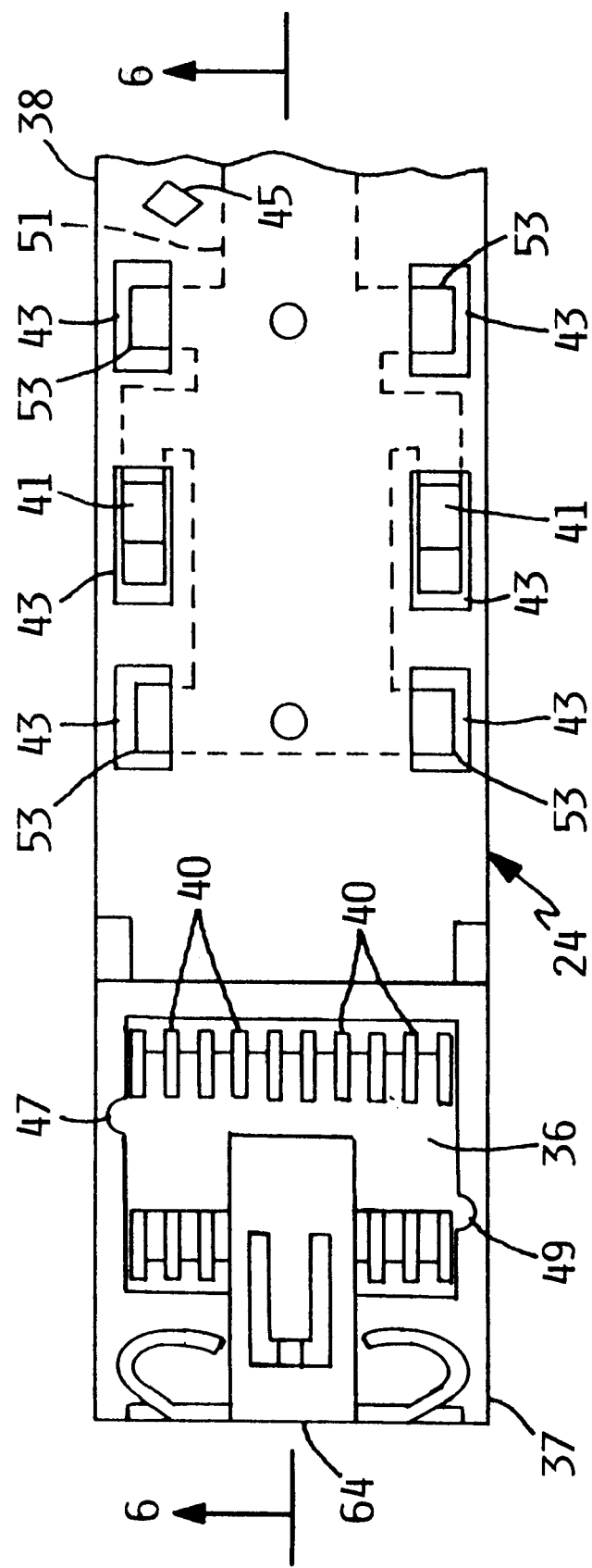
FIG. 4 is a partial top plan view of a rear portion of the camming electrical connector shown in FIG. 1.
Figure 5:
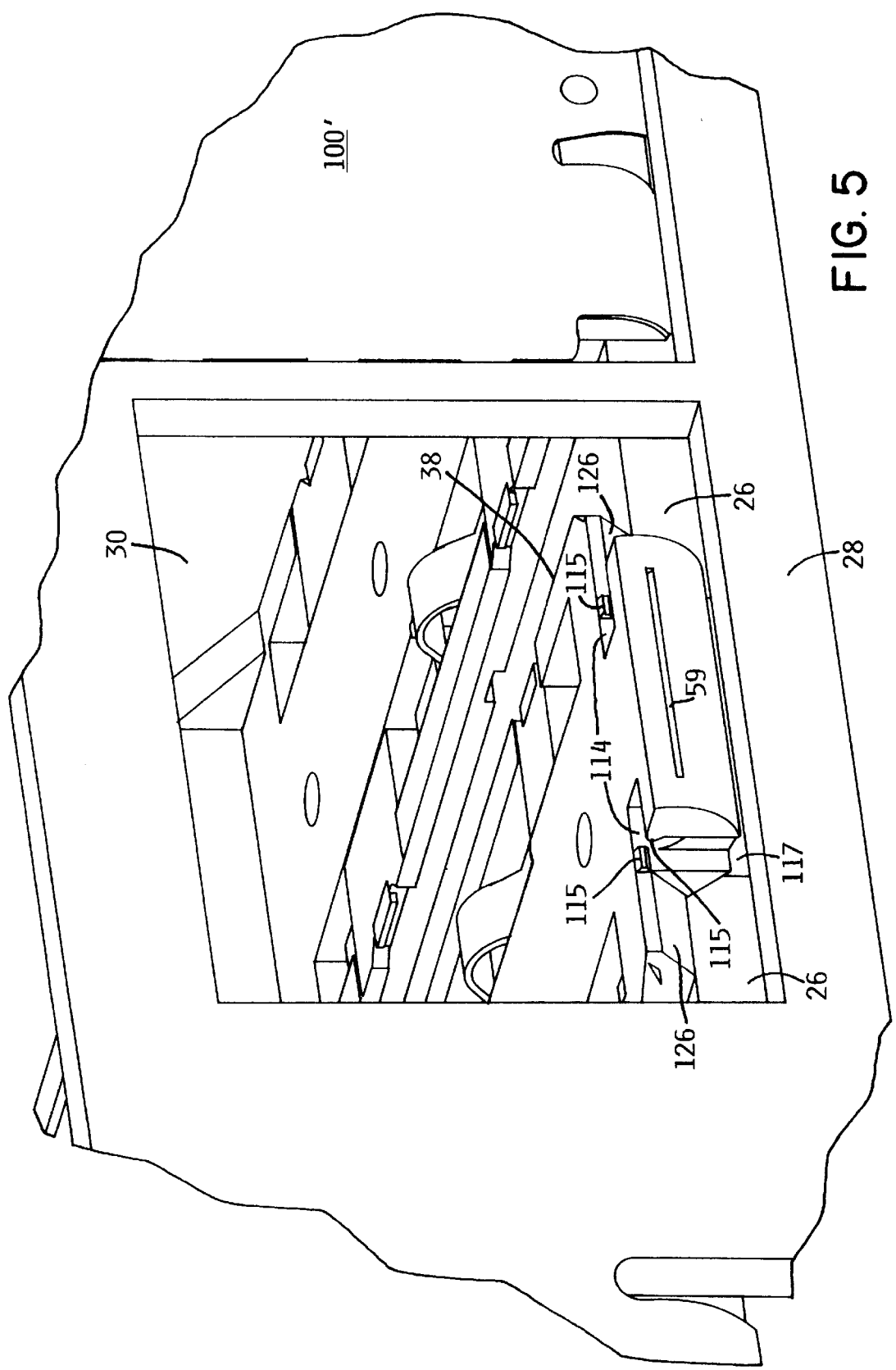
FIG. 5 is a perspective view of the distal end of the camming electrical connector shown in FIG. 1, with the door removed to show a contact portion of a grounding strip within the camming electrical connector.
Figure 6:
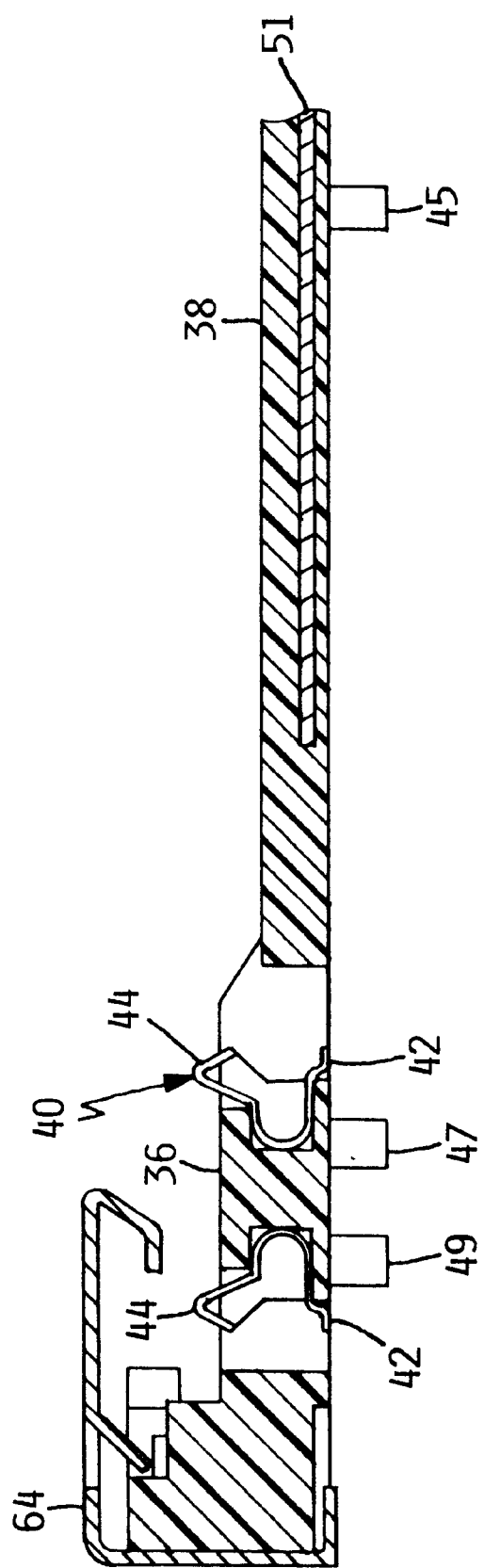
FIG. 6 is a sectional view of the camming electrical connector taken on line 6—6 of FIG. 4.

With further reference to FIGS. 4–6, connector 24 includes a connector block 36 and a guide member, such as elongated, flat or tongue-shaped guide rail 38. Connector 24 may comprise any suitable number of parts. Preferably, connector block 36 is a separate part, illustrated in FIG. 3, that fits within a rectangular opening in a camming block 37 at one end of guide rail 38. Connector block 36, camming block 37 and guide rail 38 are preferably made of plastic. Connector block 36 has two pins 47 and 49 that extend from its lower surface to facilitate mounting it to circuit board 26. Guide rail 38 has a diamond-shaped pin 45 that serves the same purpose. Guide rail 38 is elongated in the dimension or axis labeled "Z" in FIG. 1. Connector 24, including connector block 36 and guide rail 38, is preferably no wider than about 12 mm. This miniaturization allows two or more such connectors 24 to be mounted side-by-side in a standard PCMCIA-width opening to increase port density.

Two (or more in other embodiments) rows of electrical contacts 40 oriented in the X direction are mounted in connector block 36. Electrical contacts 40 are of the conventional J-lead type. That is, each contact 40 is a wire-like or strip-like member having a surface-mountable lower portion 42 connected via a generally U-shaped or J-shaped bend to an upper portion 44 that is somewhat resiliently deflectable with respect to lower portion 42. Lower portion 42 of each contact 40 is essentially flush with the lower surface of connector block 36, protruding only slightly to facilitate surface-mounting and soldering to pads 46 of circuit board 26. Circuit board 26 may comprise any suitable type of rigid or flexible printed circuit substrate, and conventional solder reflow processes can be used to surface-mount contacts 40. Upper portion 44 of each contact 40 protrudes slightly from the upper surface of connector block 36 to facilitate electrical contact, as described below. The upper surface of connector block 36 is substantially planar, and the plane defined by upper portions 44 collectively is substantially parallel to the lower surface of connector block 36. The upper and lower surfaces of connector block 36 and guide rail 38 are all mutually parallel and, when connector 24 is mounted on circuit board 26, are parallel to circuit board 26 as well. As illustrated in FIGS. 1 and 4–6, electrical coupling between connector 24 and surface-mount pads of circuit board 26 is achieved through, in addition to contacts 40, a sheet-metal grounding strip 51 that is encapsulated or molded within guide rail 38. Grounding strip 51 is bent such that two upper contact portions 41 protrude through two of the apertures 43 in guide rail 38, and extend a sufficient distance above the upper surface of guide rail 38 to resiliently contact a conductive bottom cover 39 on the underside of module 22 (see FIG. 7) that is electrically coupled to the ground potential of module 22. Likewise, grounding strip 51 is bent such that six lower contact portions 53 protrude through six other apertures 43 sufficiently to surface-mount them to pads on circuit board 26 on which a signal at ground potential would exist during operation of the system. A further contact portion 59 exists where grounding strip 51 emerges from the distal end of guide rail 38. As illustrated in FIG. 5, contact portion 59 makes contact with a tab 102 (best seen in FIG. 20) of door 100 when door 100 is in the closed position. The resulting electrical path enhances shielding against electromagnetic interference (EMI). Note that when module 22 extends through opening 30, the top wall and one or both sidewalls of its enclosure 32 make mechanical and electrical contact with the walls of opening 30, effectively sealing those gaps against EMI. Note that the sidewalls preferably have an EMI spring gasket 31 to promote such sealing. Although the contemplated purposes of contact portions 41, 53 and 59 are grounding and EMI shielding, in other embodiments of the invention such secondary contacts may be used for communication of other types of signals.

Connector 24 has a cam defined by two oppositely inclined ramps 48 and 50, having lower ends substantially level with the lower surface of connector 24 and upper ends coupled together via a flat region 52, i.e., a portion parallel to the upper and lower surfaces of connector 24. Ramps 48 and 50 may each be inclined at any suitable acute angle with respect to these surfaces, and the angles can be complementary or entirely different. Connector block 36 has indented portions shaped correspondingly to ramps 48 and 50 and region 52. In view of the corresponding ramp and indentation features, the cam can be described another way as having a groove with two portions inclined at generally opposing or complementary angles connected by a flat portion. Although in the illustrated embodiment of the invention the camming element is a cam having the above-described structure, other embodiments may have alternative cam mechanisms or other suitable types of camming elements.

Figure 7:
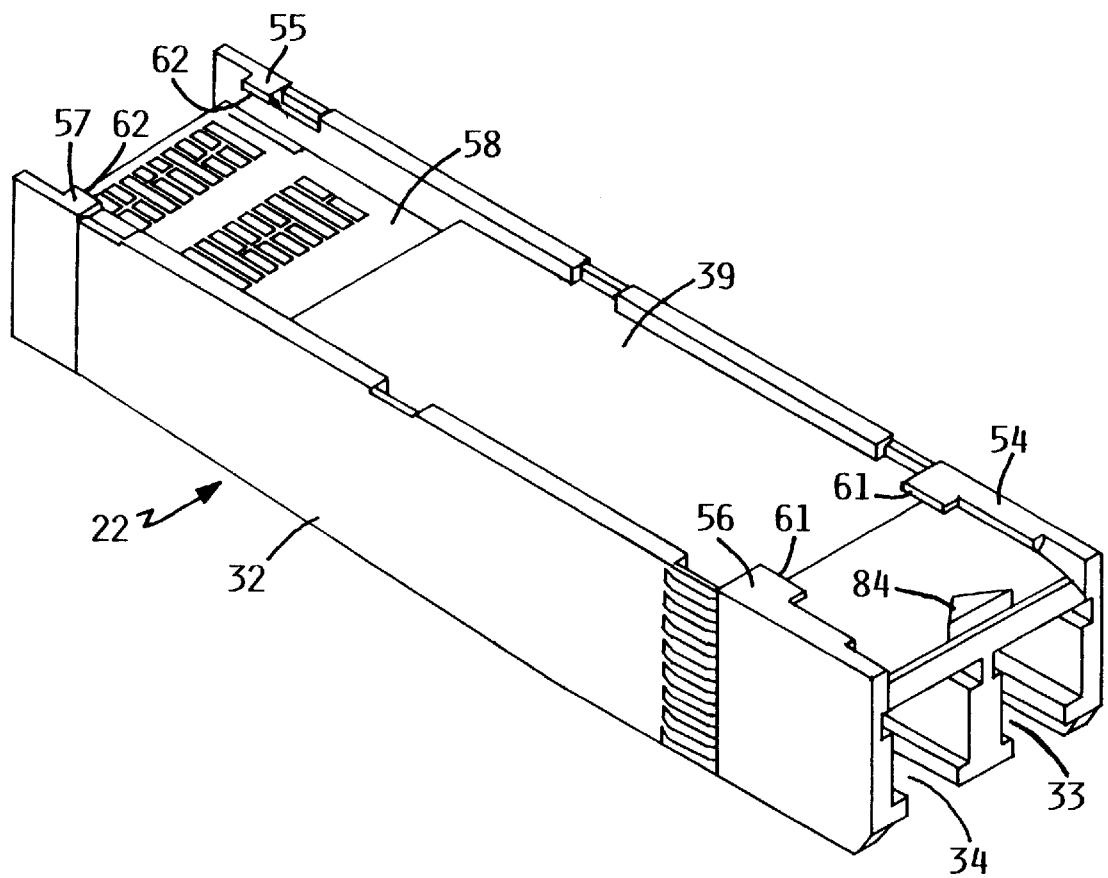
FIG. 7 is a perspective view showing the bottom of the module shown in FIG. 1.
Figure 19:
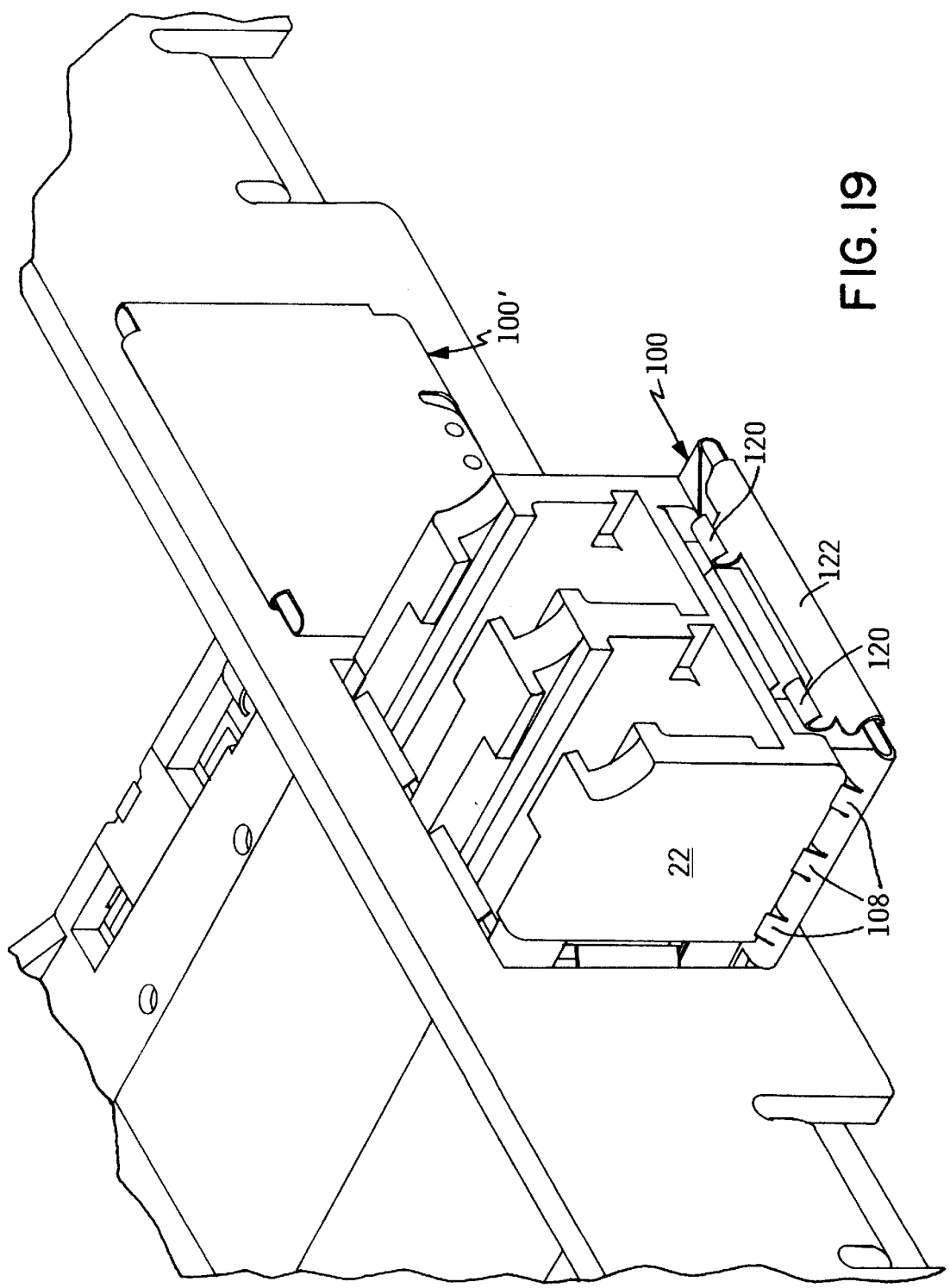
FIG. 19 is a partial perspective view of the bezel portion of the connector system shown in FIG. 16, showing the module in the fully inserted as in FIG. 9E.

To use the connector system, a user engages the forward end of module 22 on guide rail 38. As illustrated in FIG. 7, flanges 54, 55, 56 and 57 on the lower edges of the side walls of enclosure 32 define channels in which a guide rail 104 (best seen in FIGS. 16 and 20) on a surface 106 of door 100 and guide rail 38 fit closely and can be slid. Thus, module 22 is guided by guide rail 38 and guide rail 104 as the user continues to slide module 22 in the direction of connector block 24, i.e., in the Z direction. In this orientation, flanges 54–57 are substantially parallel to circuit board 26. Preferably, the module is also guided by EMI fingers 108 (best seen in FIGS. 16 and 19) on the rear of door 100.

Figure 8:
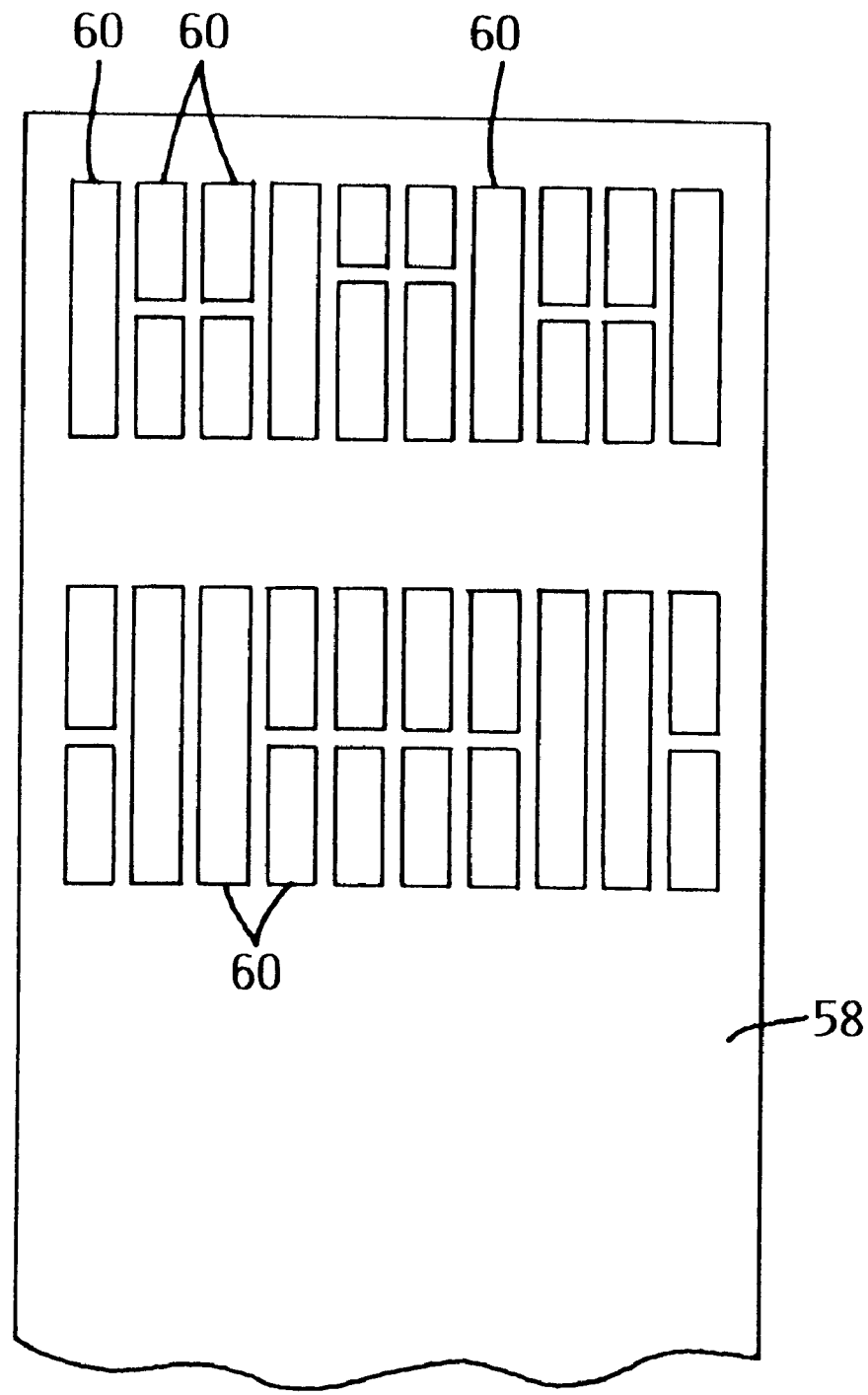
FIG. 8 is a top plan view of the contact pads of the module circuit board shown in FIG. 7.

As illustrated in FIGS. 9A–9E, illustrating this engaging action, module 22 has an internal circuit board 58 that is substantially parallel to the lower edges of module 22. As illustrated in FIG. 8, the lower surface of circuit board 58 has electrical contact pads 60. Contact pads 60 are arranged in a complementary manner with respect to contacts 40 in connector block 36. In other words, the position of each contact pad 60 on circuit board 58 mirrors the position of a contact 40 in connector block 36. Contact pads 60 are preferably of different lengths to provide a signal connection sequencing function when electrical contact is made. When the forward end of module 22 reaches connector block 36, the cam-follower projections 62 of flanges 55 and 57 travel in or follow the cam groove. Initially, they engage the lower ends of ramps 48. Ramps 48 redirect to the Y direction a portion of the force they experience in the Z direction. Projections 62 thus ride up ramps 48 (i.e., partially in the Y direction and partially in the Z direction), lifting forward end of module 22 and with it circuit board 58. When projections 62 reach the upper ends of ramps 48 in response to continued force applied by the user in the Z direction, they move onto flat regions 52. When projections 62 reach the other end of flat regions 52, they ride down ramps 50 in a similar manner (i.e., partially in the Y direction and partially in the Z direction). The groove walls that are complementary to ramps 50 redirect to the Y direction a portion of the force they experience in the Z direction. As projections 62 move downwardly, circuit board 58 descends toward the upper surface of connector block 36. As circuit board 58 descends, contact pads 60 of circuit board 58 make contact with upper portions 44 of contacts 40, deflecting them slightly in the Y direction.

Figure 9A:
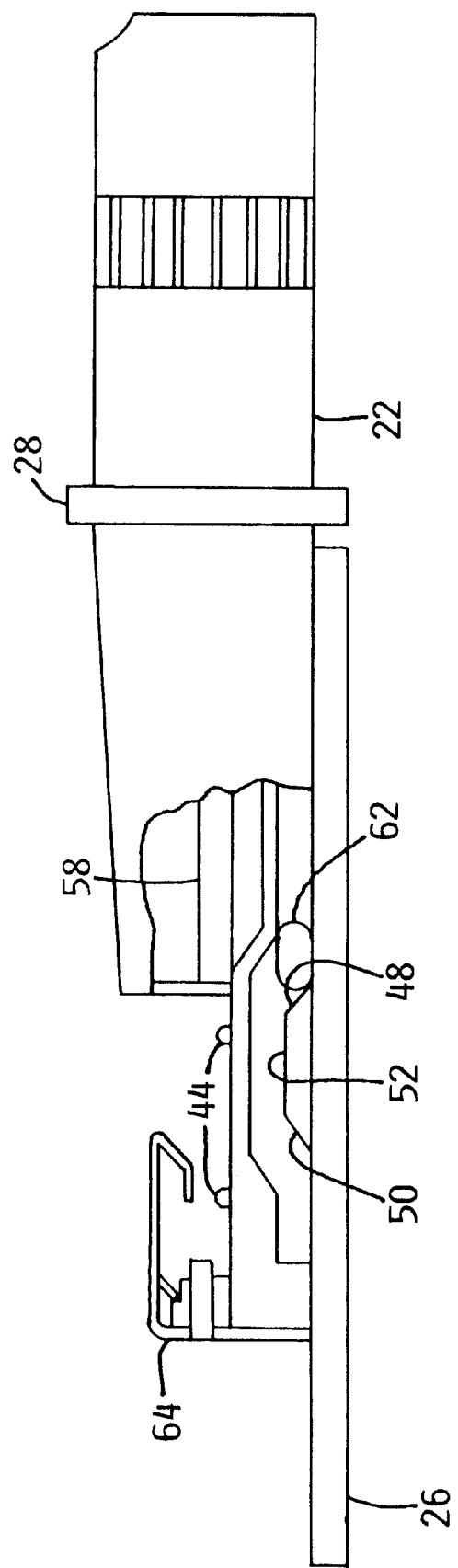
FIG. 9A illustrates the beginning of the engaging action between the camming electrical connector and the module shown in FIG. 1.
Figure 9C:
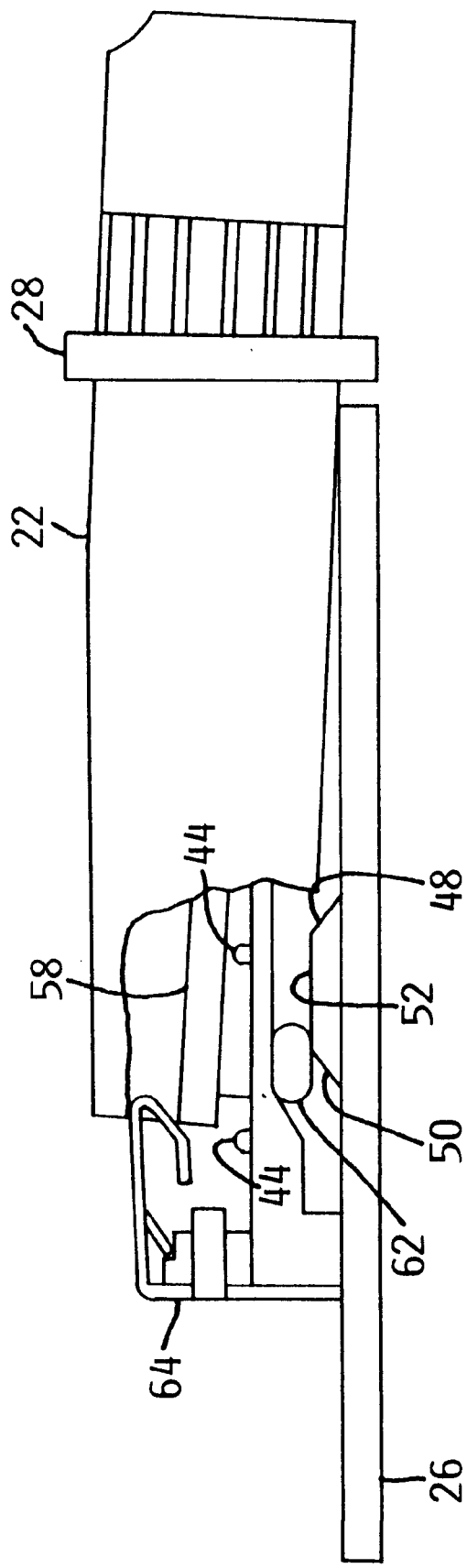
FIG. 9C is similar to FIGS. 9A–B and illustrates still further progression in the engaging action.
Figure 9D:
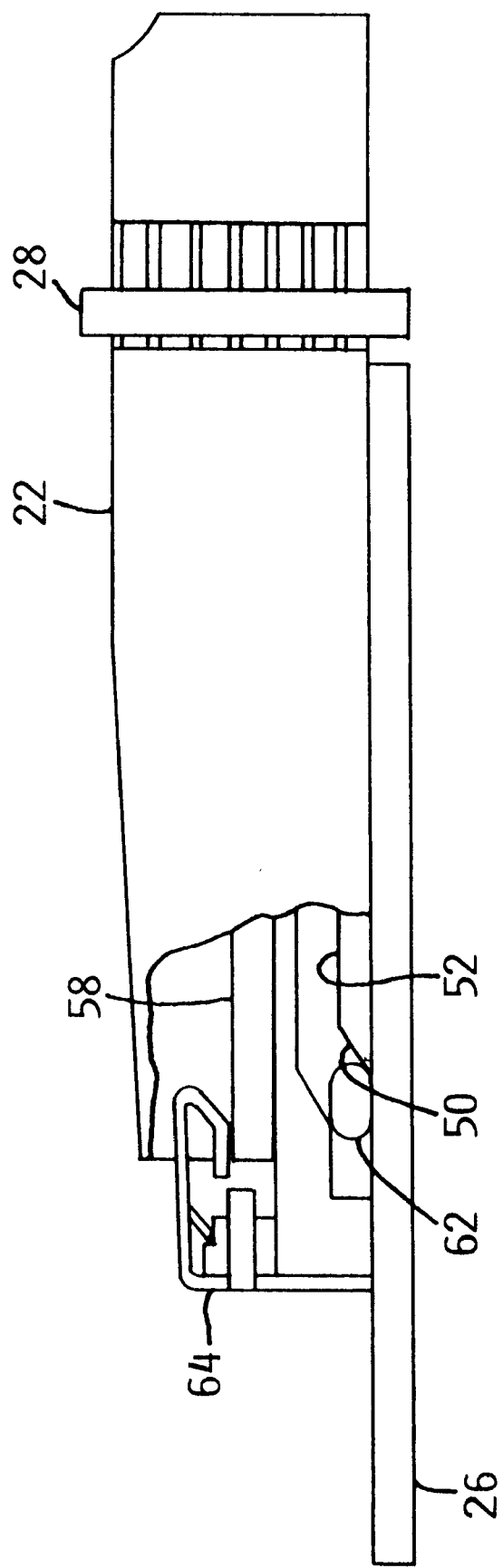
FIG. 9D is similar to FIGS. 9A–C and illustrates yet further progression in the engaging action.
Figure 9E:
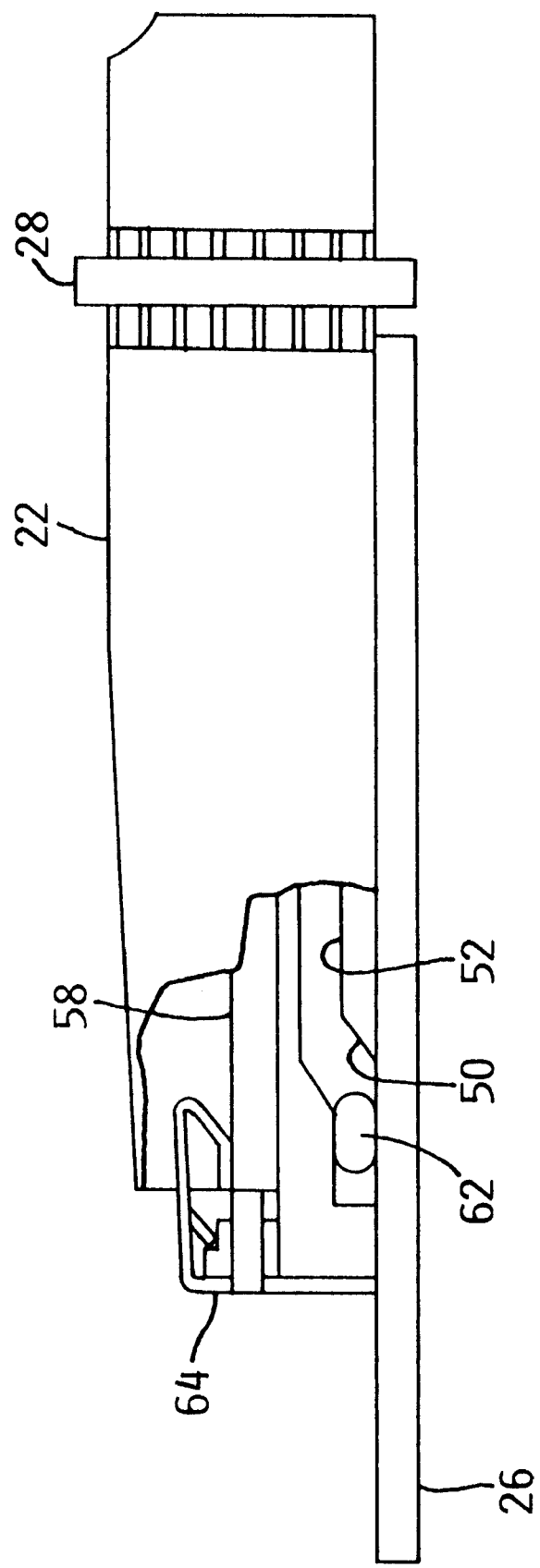
FIG. 9E is similar to FIGS. 9A–D and illustrates the end of the engaging action, with the electrical contacts fully engaged.
Figure 10:
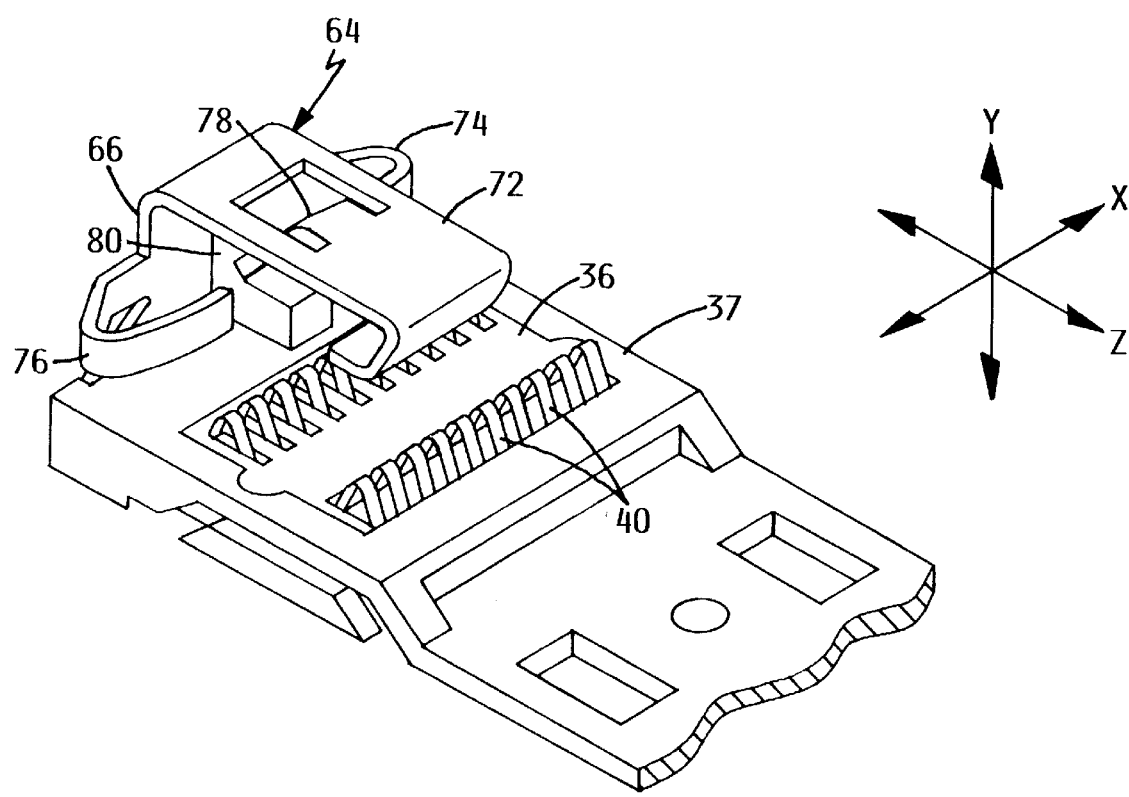
FIG. 10 is a partial perspective view of the camming electrical connector shown in FIG. 1, showing the spring clip.
Figure 11:
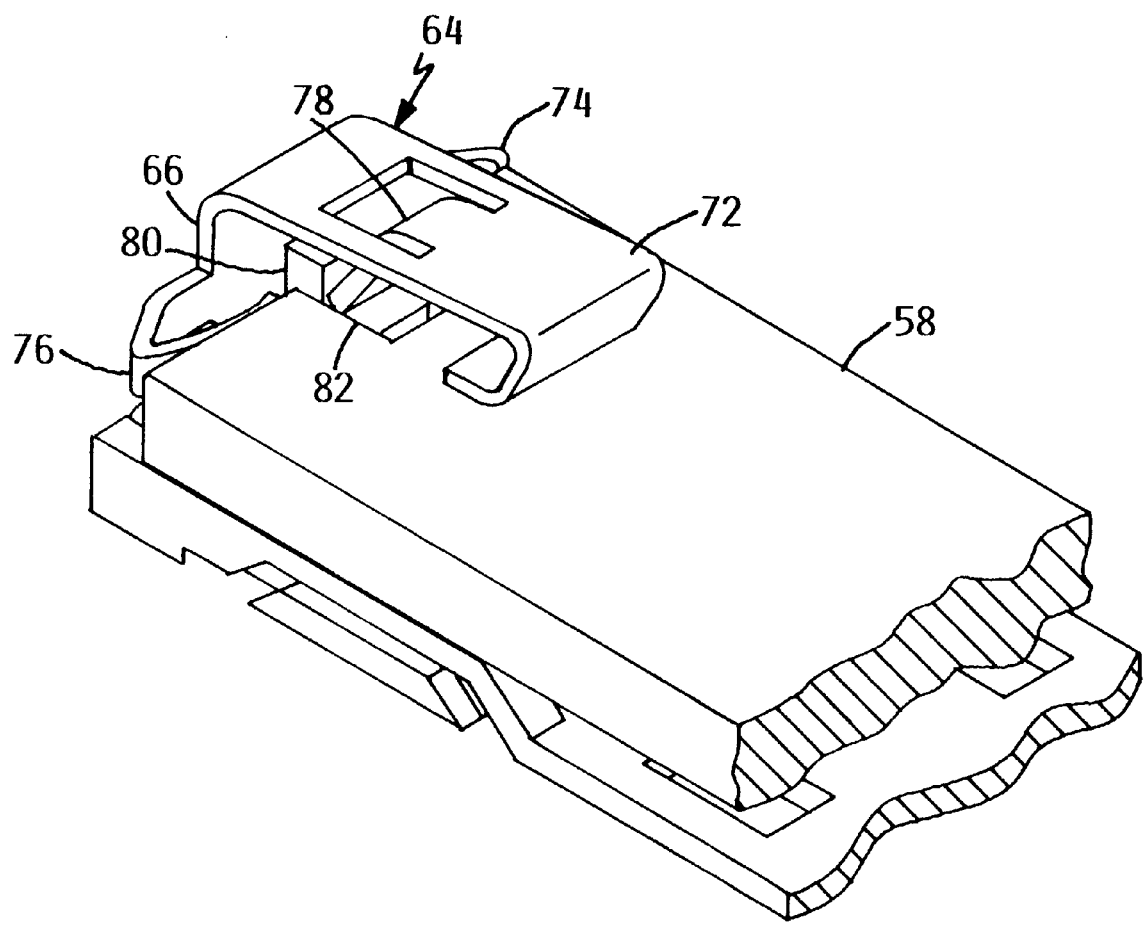
FIG. 11 is a perspective view similar to FIG. 10, showing the engaging action between the camming electrical connector and the circuit board of the module.
Figure 12:
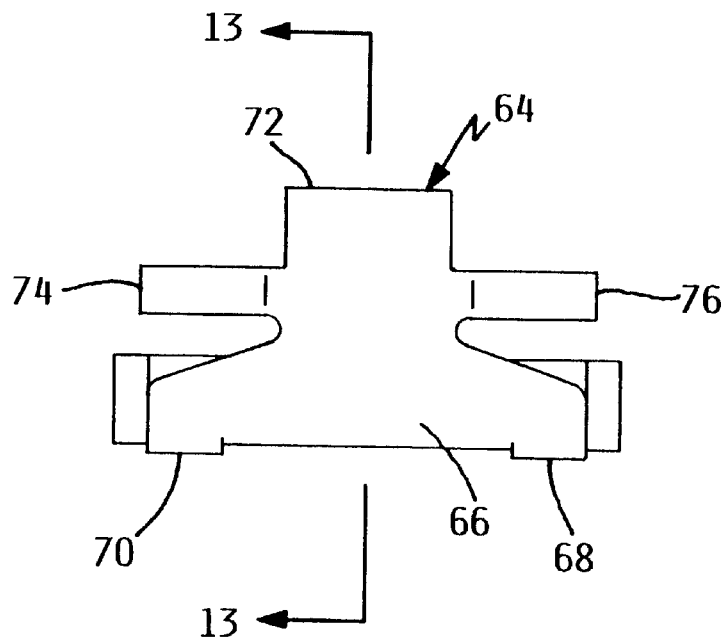
FIG. 12 is an end view of the camming electrical connector shown in FIG. 1, showing the spring clip.
Figure 13:
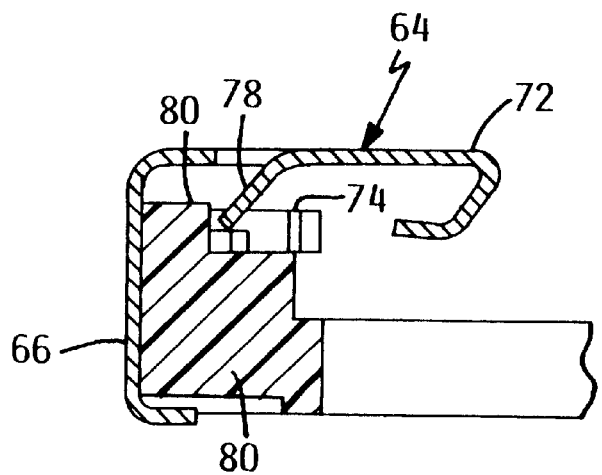
FIG. 13 is a sectional view taken on line 13—13 of FIG. 12.
Figure 14:
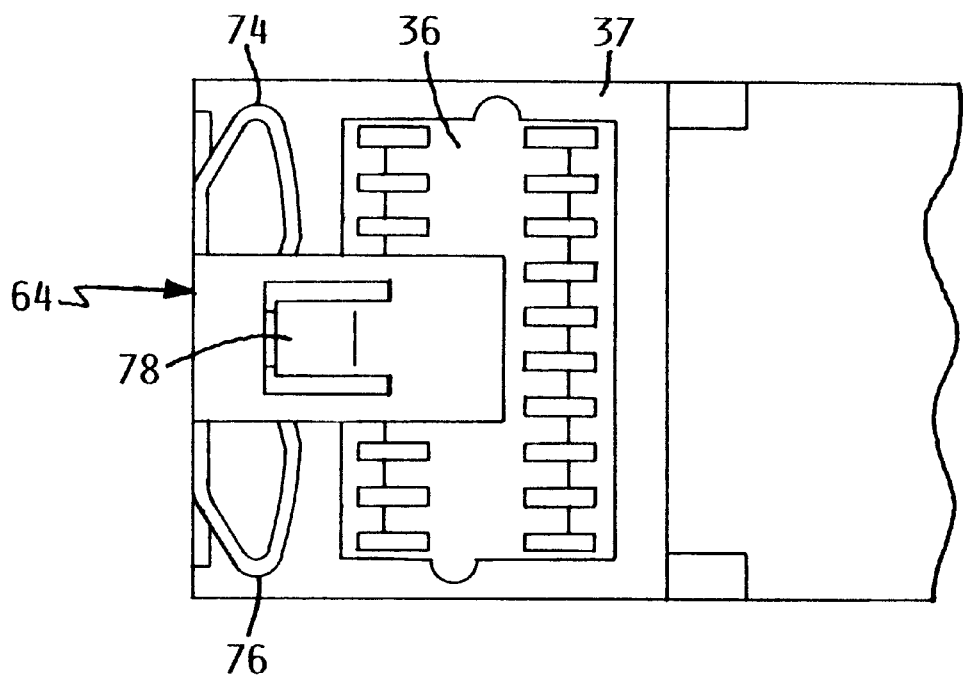
FIG. 14 is a top plan view of a portion of the camming electrical connector shown in FIG. 1.
Figure 15:
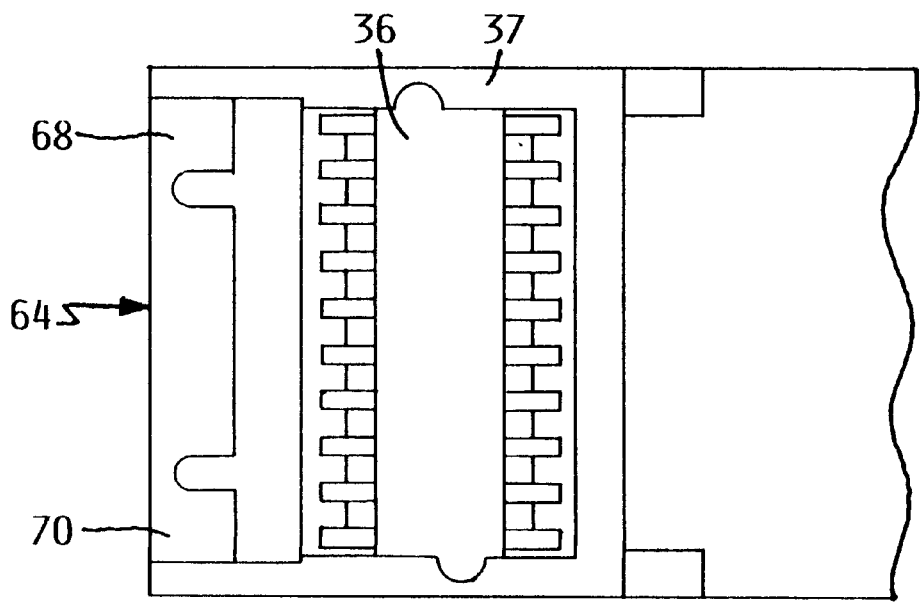
FIG. 15 is a bottom plan view of a portion of the camming electrical connector shown in FIG. 1.

Also, as best illustrated in FIGS. 9E, 10 and 11, as module 22 nears the end of its travel, spring clip 64 engages the upper surface of circuit board 58 and also makes contact with a grounding contact pad (not shown) thereon. Spring clip 64 is deflected slightly by circuit board 58, and resiliently biases circuit board 58 downwardly to further mechanically secure module 22 to connector 24 while providing an additional path for coupling module 22 to the ground potential of assembly 20.

As module 22 nears the end of its travel, flanges 54 and 56 engage the edges of guide rail 104. This late-engagement feature secures the optical coupling end of module 22 to guide rail 104 to complement the securing action of the camming mechanism at the electrical coupling end. Securing module 22 at both ends in this manner promotes good electrical contact between its conductive bottom cover 39 and upper contact portions 41 of grounding strip 51. Inward extensions 61 on flanges 54 and 56 define over-travel stops that prevent module 22 from being inserted too far into assembly 20 by abutting against corresponding stop members 110 (best seen in FIG. 17) on guide rail 104. That is, stop members 110 allow flanges 55 and 57 to pass but not flanges 54 and 56, which extend inward toward the center of module 22 further than flanges 55 and 57.

Spring clip 64 provides a combined lock-down and kick-out force. As illustrated in FIGS. 10–15, spring clip 64 is a unitary piece of spring steel or other suitable material that is bent into the following portions: Spring clip 64 has a planar base portion 66 abutting the end of the camming block 37. Base portion 66 is preferably aligned with a plane defined by the X-Y axes, i.e., normal to the Z axis, but precision in this alignment is not critical. Spring clip 64 also has two tabs 68 and 70 that extend from the lower area of base portion 66 in the direction of the Z axis along the underside of camming block 37. Tabs 68 and 70 can be surface-mounted to printed circuit board 26 to provide grounding. Extending from the upper area of base portion 66 in the general direction of the Z axis is a lock-down member 72. The distal end of lock-down member 72 is J-shaped or blunted to ease contact with module 22 during connection. In a particularly advantageous embodiment of the invention, in which spring clip 64 is made of spring steel 0.409 mm in thickness, lock-down member 72 provides a resilient bias force in the Y direction of approximately 15 newtons (N) at 0.68 mm deflection. Two generally U-shaped kick-out members 74 and 76 also extend from base portion 66. In an embodiment in which kick-out members 74 and 76 are oriented at this angle and spring clip 64 is made of spring steel 0.409 mm thickness, kick-out members 74 and 76 provide a resilient bias force in the Z direction of approximately 20 N at 0.45 mm deflection.

A barb 78 is formed in a portion of lock-down member 72 that has been cut in a U-shape by bending the portion within the cut downwardly. Camming block 37 has a step-shaped alignment block 80 on its upper surface. (See FIG. 13.) The distal end of barb 78 abuts the step to brace spring clip 64 against twisting or bending backwards in response to the force along the Z axis that spring clip 64 experiences when module 22 is mated, i.e., plugged in. Circuit board 58 of module 22 has an opening or slot 82 into which alignment block 80 moves as module 22 nears the end of its travel. Alignment block 80 fits closely within slot 82, thereby aligning circuit board 58 and its module 22 with connector block 37. Importantly, this alignment occurs before the contact pads 60 of circuit board 58 make contact with contacts 40. Thus, pads 60 are aligned with contacts 40 at the time contact is made. This precision alignment mechanism and alignment-before-contact sequencing allows the contact density to be quite high, which is desirable in many embodiments of the invention.

To further secure module 22 to connector 24 when electrical contact is made, module 22 and door 100 include a module latch mechanism. A portion of the latch is included in module 22, and a mating portion is included in door 100. Module 22 has a triangular tab 84 (best seen in FIG. 7) that snaps into a triangular recess 86 in door 100 in response to relative movement in the Z direction. To release the latch, the user depresses door 100 and disengages it from tab 84. The user can then slide module 22 on guide rail 38 away from assembly 20. The mating parts disengage and electrical contact is broken in the reverse manner from that described above. When the latch is engaged, module 22 is retained in the position illustrated in FIGS. 11 and 19. The then-deflected kick-out members 74 and 76 store potential energy in the resilient manner of a spring. When the latch is released, the deflected kick-out members 74 and 76 release their energy in the form of a force sufficient to eject or kick module 22 out slightly.

Figure 16:
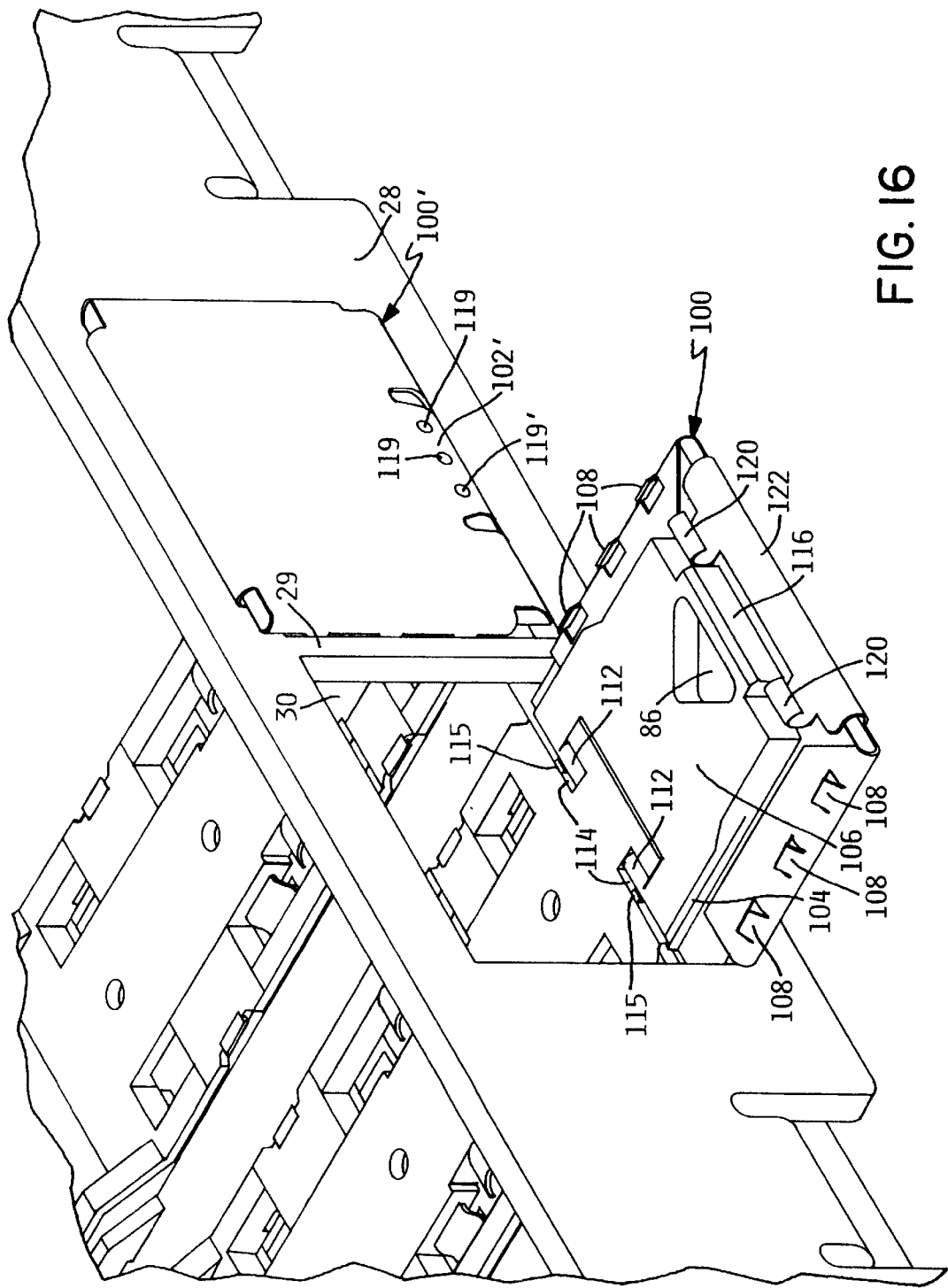
FIG. 16 is a partial perspective view of the bezel portion of the connector system shown in FIG. 1, showing the left door in the open position and the right door in the closed position.

Referring now to FIG. 16, door 100 is pivotably mounted at the distal end of guide rail 38. Door 100 has a pair of hinge pins 112, while guide rail 38 has a pair of hinge pin retention features 114 (best seen in FIGS. 5 and 16) mateable with hinge pins 112. Of course, it may be desirable to place the hinge pins on guide rail 38 and the hinge pin retention features on the door instead. Preferably, hinge pins 112 snap into hinge pin retention features 114. This snap engagement may be accomplished by snap projections 115 (best seen in FIGS. 5 and 16) molded to project within each hinge pin retention feature 114 on both sides of both hinge pins 112. Preferably, at least the upper sides of snap projections 115 are tapered or inclined in a wedge-like manner to facilitate this snap engagement. The lower sides of snap projections 115 may also be tapered or inclined in a wedge-like manner so that door 100 will snap free from its engagement with the distal end of guide rail 38 if it is inadvertently bumped or jarred with sufficient force. Once engaged in this manner, door 100 is not easily dislodged or removed. Nevertheless, if it is struck or jarred with sufficient force, hinge pins 112 will dislodge from hinge pin retention features 114, allowing door 100 to break free, undamaged. This removability of door 100 decreases the likelihood of such a force damaging it or other parts. Also, because the snap engagement between door 100 and guide rail 38 is accessible from outside bezel 28, repair or replacement of door 100 may be readily accomplished without opening the enclosure. Thus, it is unnecessary to turn off the computer or electronic device to repair or replace the door 100, thereby increasing availability.

In addition, it may be desirable to select the material used for hinge pins 112 to be weaker than that of guide rail 38 so that hinge pins 112 shear off if door 100 is pushed downward with sufficient force. In this regard, it is noted that grounding strip 51, which terminates with contact portion 59, serves to reinforce guide rail 38 in the area of hinge pin retention features 114. Shearing of hinge pins 112, however, must be balanced against the axial module delatching forces so that hinge pins 112 do not shear before module 22 is delatched. Nonetheless, hinge pins 112 should be fail safe, i.e., protect module 22 and guide rail 38 by either popping out of hinge pin retention features 114 or failing before the expensive module 22 or guide rail 38 are damaged.

Figure 17:
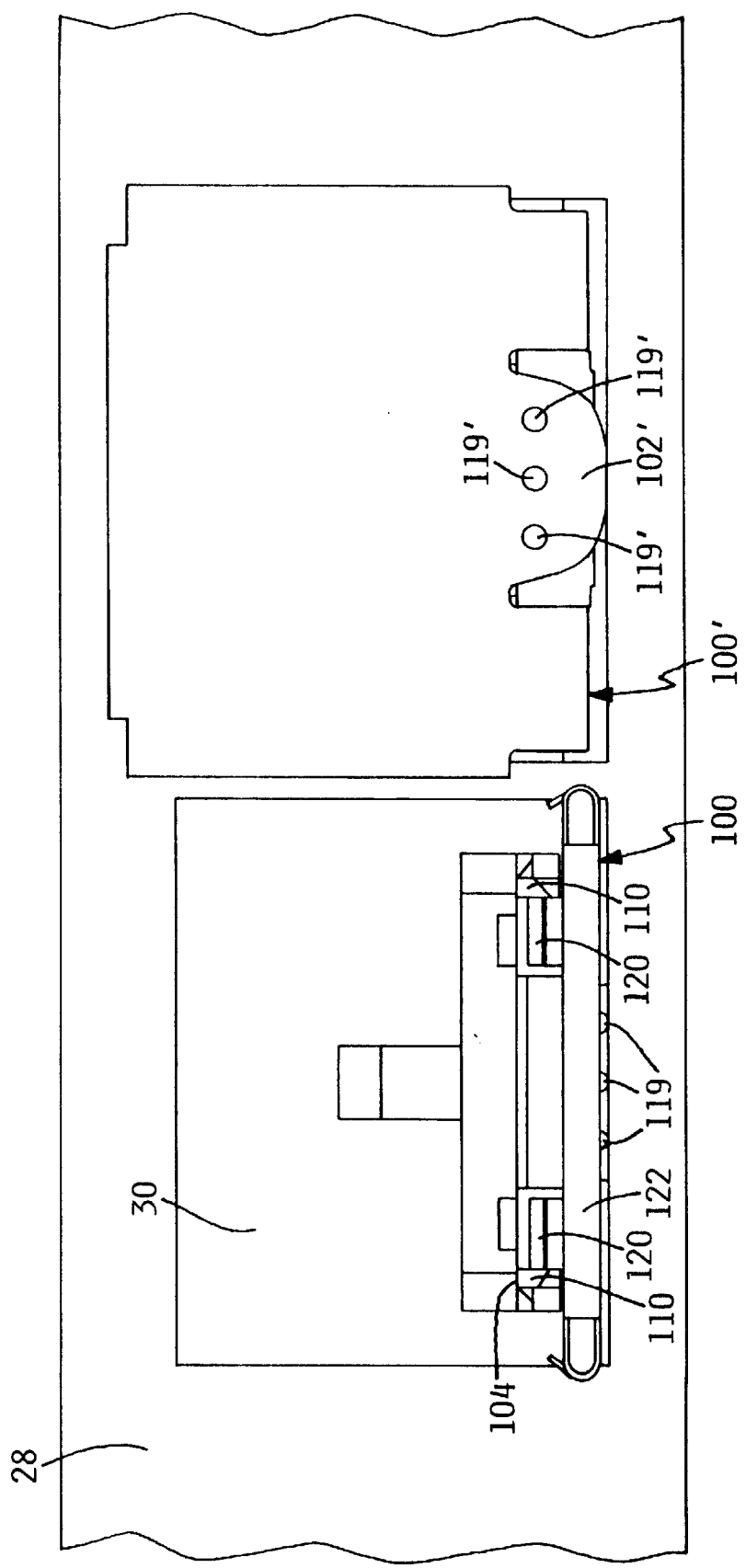
FIG. 17 is a partial front elevational view of the bezel portion shown of the connector system in FIG. 16, showing the left door in the open position and the right door in the closed position.

Door 100 is pivotable between an open position exposing opening 30 in bezel 28 and a closed position where a portion of the door outside the enclosure covers the opening 30. FIGS. 16 and 17, for example, show the left door 100 in the open position and the right door 100' in the closed position.

Door 100 and bezel 28 each comprise an electrically conductive material and are configured to make electrical contact each other when said door 100 is closed. Preferably, door 100 has a molded plastic core 116 with integral molded hinge pins 112 or insert molded metal hinge pins. For metal hinge pins, it is desirable for the metal hinge pins to contact the grounding strip 51 of guide rail 38 to electrically connect the metal hinge pins to the chassis ground. The metal hinge pins connect to the bezel 28 through the grounding strip 51, which connects to the conductive cover of module 22 via upper contact portions 41, and then to bezel 28 via EMI spring gasket 31 of module 22.

Figure 20:
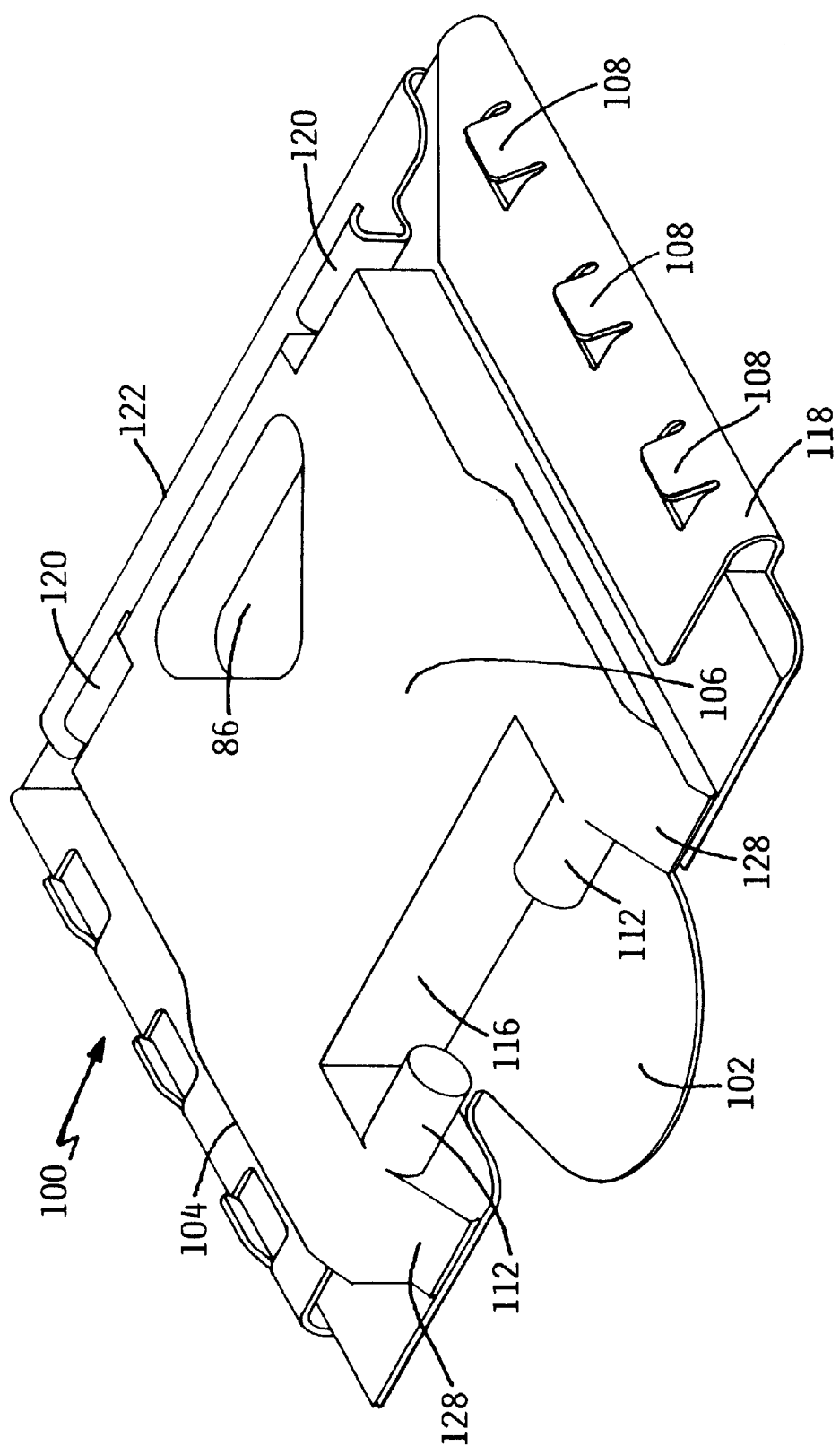
FIG. 20 is a perspective view showing the rear of the door shown in FIG. 1.

As best seen in FIG. 20, door 100 includes a metal cover 118 that is bent so as to conform to and be retained by molded plastic core 116. Alternatively, metal cover 118 may be attached to molded plastic core 116 using adhesive, insert molding, fasteners or the like. In another alternative embodiment, the exterior of molded plastic core 116 may be metallized. In yet another alternative embodiment, door may be completely made of metal rather than being clad in metal. Metal cover 118 is preferably a resilient, conductive metal, such as nickel silver or beryllium copper. Still more preferably, the metal cover is nickel silver with a thickness of about 0.004 inch.

Figure 18:
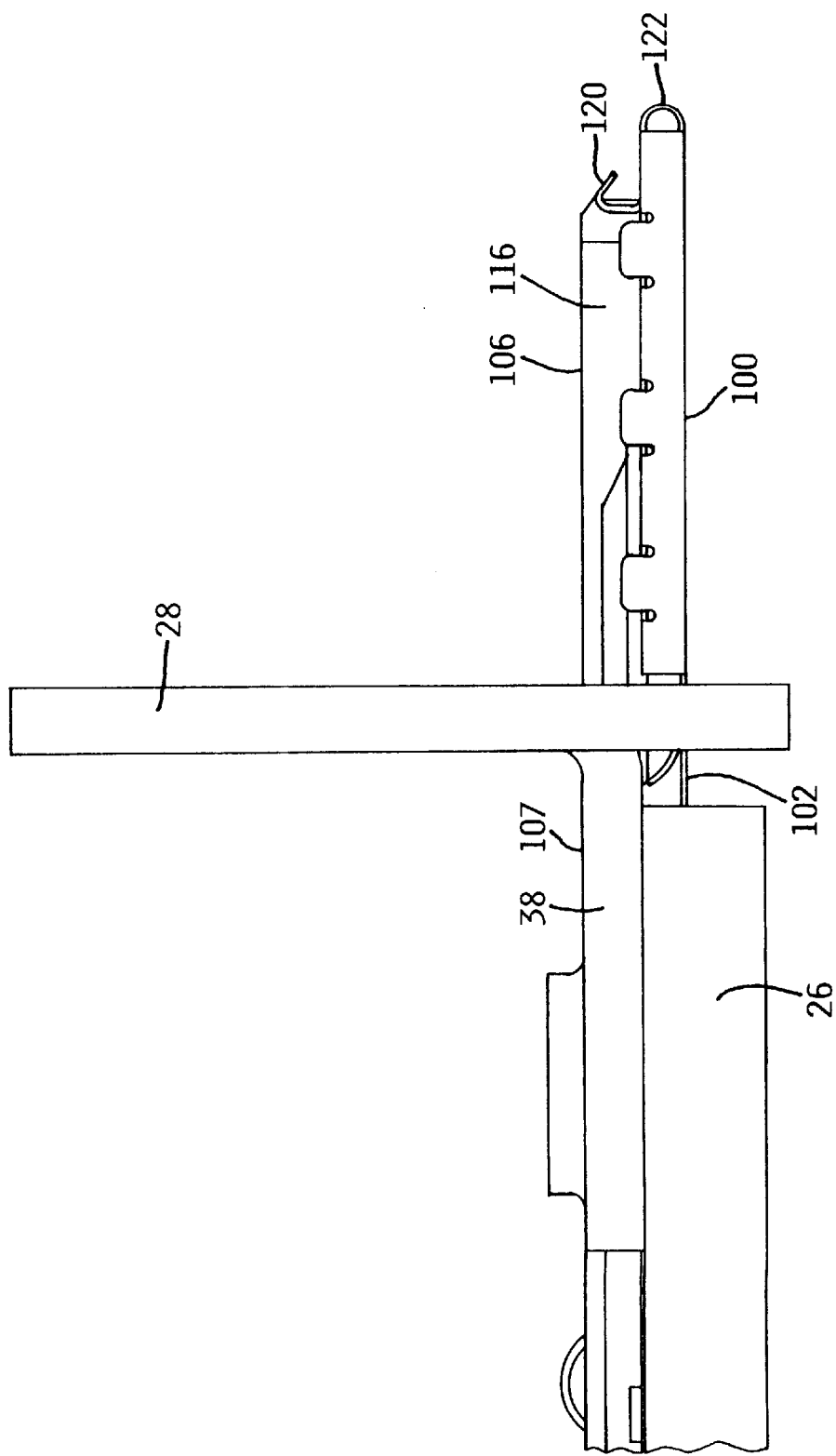
FIG. 18 is a partial left side elevational view of the bezel portion of the connector system shown in FIG. 16, showing the left door in the open position.

Preferably, tab 102 (best seen in FIG. 20) extends from the lower end of metal cover 118. As best seen in FIG. 18, when door 100 is in the open position, tab 102 extends through bezel 28 into a relief area 117 (best seen in FIG. 5) in printed circuit board 26. Relief area 117 may be formed in printed circuit board in any conventional manner such as routing. When door 100 is moved toward the closed position, tab 102 resiliently deforms as it slides against the bottom edge of opening 30 within bezel 28. This is best seen in FIGS. 16 and 17 with respect to tab 102' of right door 100'. The resilient deformation of tab 102 spring biases door 100 away from the closed position and toward the open position. In addition, as best seen in FIG. 17, tab 102 preferably includes a plurality of dimples 119 that project from the surface thereof to contact the lower edge of opening 30 in bezel 28 when the door is in the open position. Three dimples 119 are shown in FIG. 17, but any number of dimples may be used both on tab 102 and on portions of metal cover 118 adjacent to tab 102. For example, dimples may extend along the entire width of metal cover 118. Tab 102 and dimples 119 aid in EMI shielding when door 100 is in the closed position through the tab's resilient contact with bezel 28, and when door 100 is in the open position through the dimples' contact with bezel 28. Dimples 119 keep door 100 from being left electrically floating or unconnected when door 100 is in the open position. Module 22 may also serve to complete door to bezel electrical connection—through the conductive covers of module 22, to grounding strip 51 via upper contact portions 41, and back to bezel 28.

Figure 21:
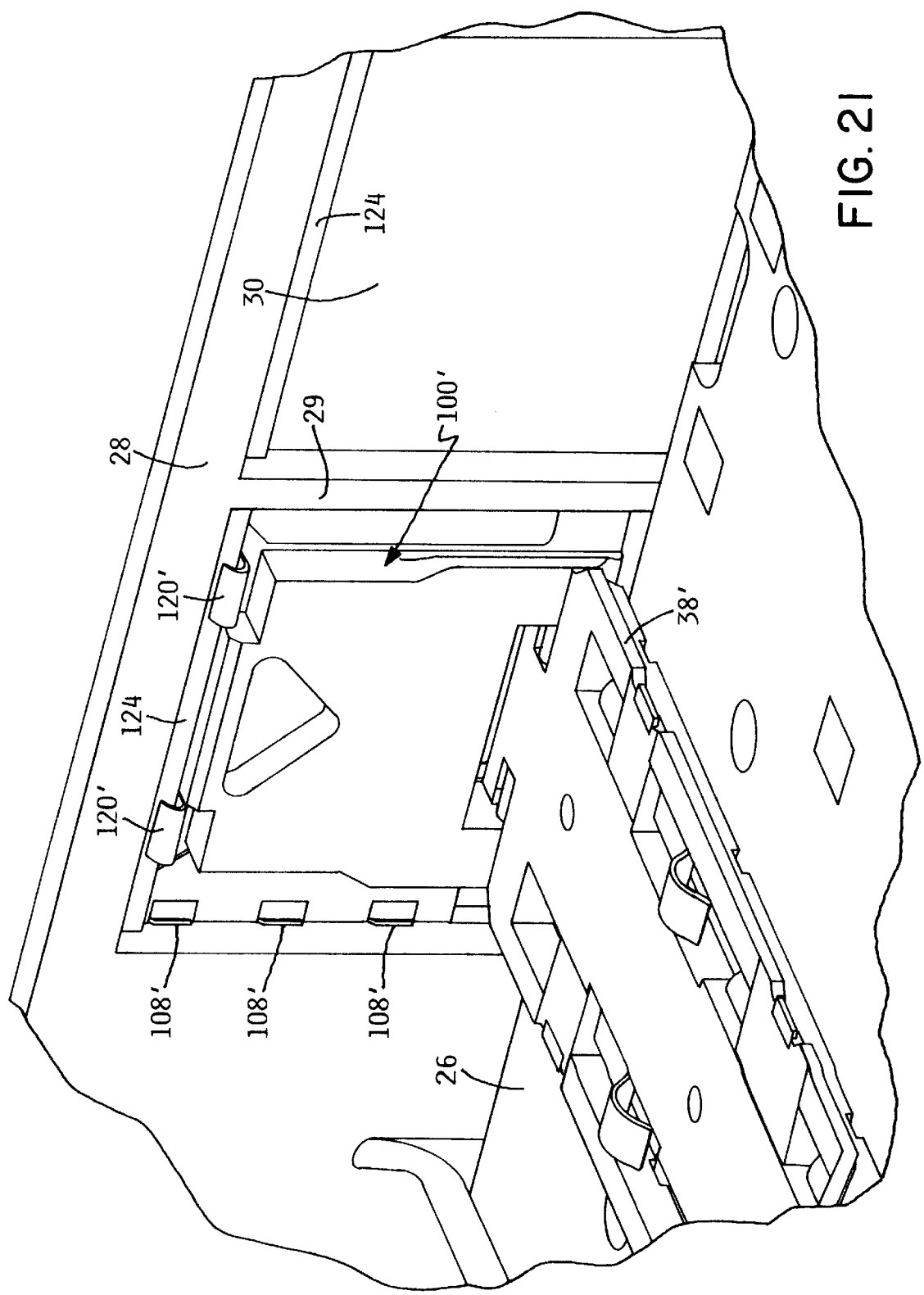
FIG. 21 is a partial perspective view of the bezel portion of the connector system shown in FIG. 16, showing the rear of the bezel portion and the right door in the closed position.

Also preferably, metal cover 118 is bent to form a pair of door latches 120 that extend from a door latch release area 122 on the upper end of metal cover 118. When door 100 is moved from the open position toward the closed position against the spring bias of tab 102, door latches 120 engage against the top edge of opening 30. As the movement of door 100 toward the closed position is continued, door latches 120 resiliently deform and pass through opening 30 in bezel 28 until door latches snap into a relief area 124 formed in bezel 28 adjacent the top edge of opening 30. Thus, door 100 is positively latched in the closed position. This is best seen in FIG. 21 with respect to door latches 120' of right door 100'. Relief area 124 may be formed in bezel 28 in any conventional manner, but is preferably coined into bezel 28 prior to stamping opening 30 in bezel 28. Door 100 is released from the closed position by pushing down on door latch release area 122 that resiliently deforms to disengage door latches 120 from relief area 124 and the top edge of opening 30. The spring bias provided by tab 102 then serves to move door 100 toward the open position. Door latches 120 and door latch release area 122 aid in EMI shielding when door 100 is in the closed position through contact with bezel 28.

In addition, it is preferred that EMI fingers 108 are formed in metal cover 118 to extend from the left end and right end of metal cover 118. EMI fingers 108 are formed in metal cover 118 in any conventional manner, but preferably are cut into metal cover 118 and then bent to project from the rear surface of door 100. Preferably, EMI fingers 108 are positioned and sized to contact to bezel 28 when door 100 is in the closed position. EMI fingers 108 aid in EMI shielding when door is in the closed position through contact with bezel 28. The top end of door 100 has sufficient overlap with bezel 28 (that is door 100 is oversized relative to the size of opening 30 in bezel 28) so EMI fingers are not necessary along the top end of door. However, it may be desirable to include some EMI fingers there too. It is important to note that the positive latch provided by door latches 120 allows EMI fingers 108 and tab 102 to compress and apply sufficient pressure for a good electrical connection. Without the positive latch, door 100 would spring open due to the pressure of EMI fingers 108 and tab 102.

Because door 100 is positively latched in the closed position, rather than merely being biased toward the closed position, it effectively minimizes the likelihood of electromagnetic emissions escaping from the computer or other electronic device. In addition to providing effective EMI shielding, door 100 effectively minimizes the likelihood of dust entering the computer or other electronic device. EMI shielding is further enhanced when door 100 is in the closed position because tab 102 of door 100 makes electrical contact with contact portion 59 of grounding strip 51 in guide rail 38.

As discussed above, when door 100 is in the open position its guide rail 104 and EMI fingers 108 help guide module 22. To accomplish this, it is necessary to precisely position door 100 in the open position. This is accomplished through the spring bias of tab 102 and/or gravity in combination with the cooperation of stops 126 on guide rail 38 (best seen in FIG. 5) and stops 128 on door 100 (best seen in FIG. 20). As best seen in FIG. 18, when the stops 126 and stops 128 meet, surface 106 of door 100 is flush and coplanar with a top surface 107 of guide rail 38. This meeting of the stops 126 and 128 defines the open position of door 100. Also, the surface of said door may also have a recess mateable with a correspondingly shaped latch member of the module when insertion of the module is complete.

Figure 22:
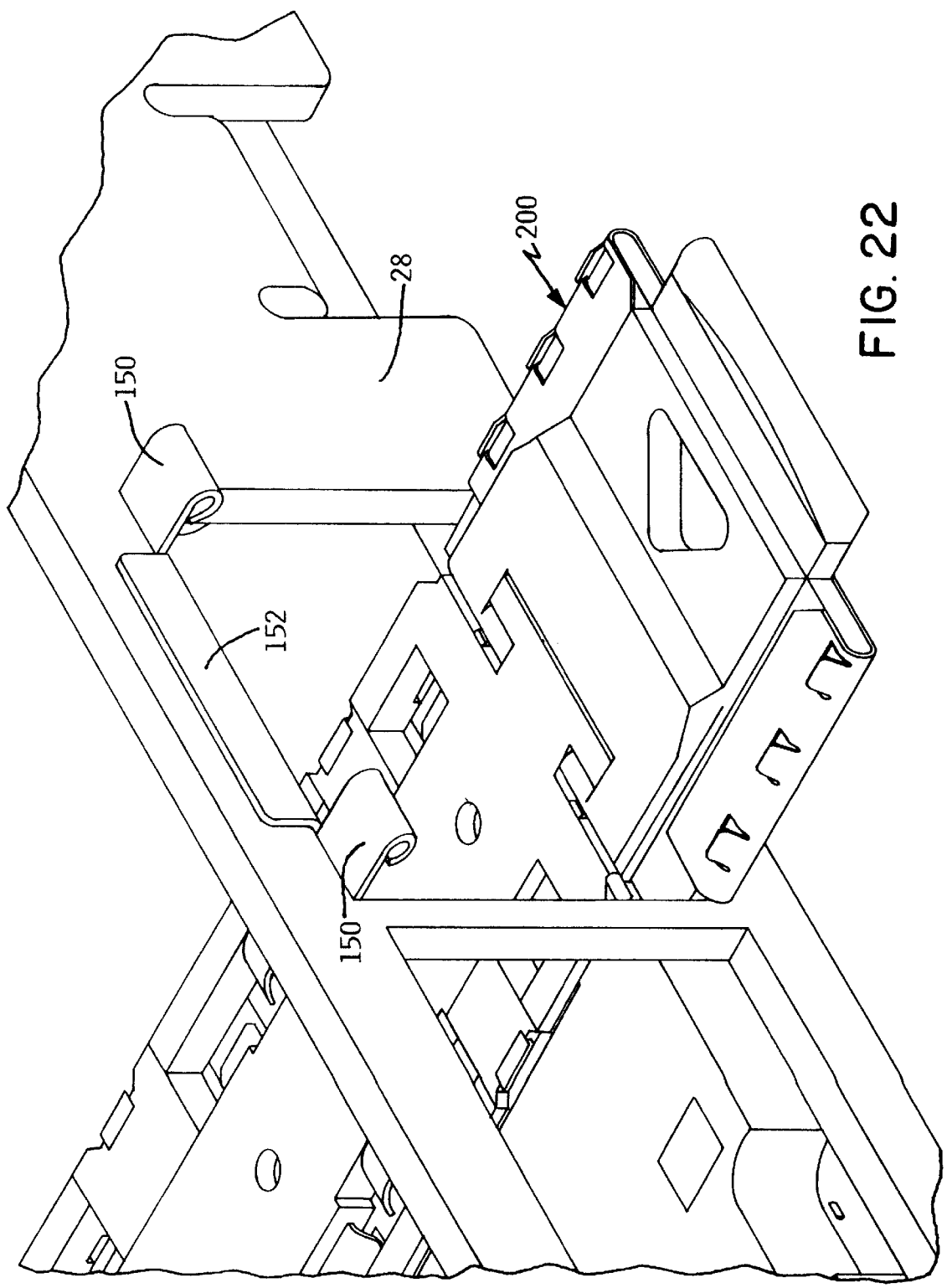
FIG. 22 is a partial perspective view of a bezel portion of a connector system according to a second embodiment of the present invention, showing a door in the open position.
Figure 23:
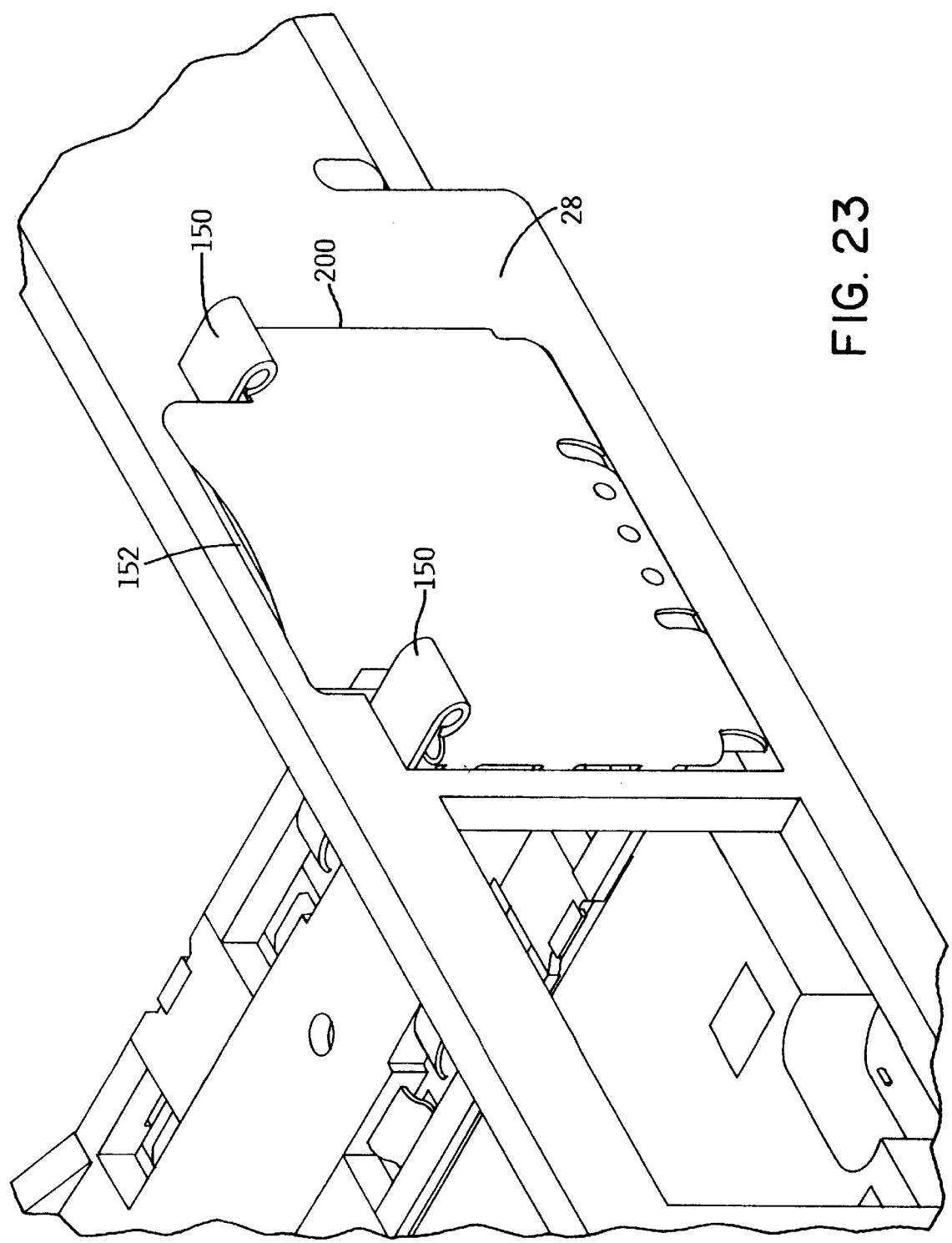
FIG. 23 is a partial perspective view of a bezel portion of the connector system shown in FIG. 22, showing the door in the closed position.

FIGS. 22 and 23 show a second embodiment of the present invention that includes door latches 150 on bezel 28, rather than on the door. A spacer 152 is also mounted on bezel 28 between the latches 150. Door 200 is similar to door 100 in the first embodiment. However, door 150 has no door latch release area or door latches. In addition, the top end of door 150 is shaped differently to cooperate with door latches 150 and spacer 152. Door 150 is pushed until latched by door latches 150 on bezel 28 in the closed position. Door 150 is pulled from its top end near spacer 152 for release from door latches 150 on bezel 28.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. An electronic device, comprising:
   an enclosure having a bezel that has an opening;
   a circuit board mounted within said enclosure; and
   an electrical connector comprising:
      a guide member mounted on said circuit board, said guide member being elongated between first and second ends along a first axis and having a width oriented along a second axis perpendicular to said first axis;
      a connector block at said first end of said guide member;
      a plurality of electrical contacts retained in said connector block; and
      a door pivotably mounted at said second end of said guide member, said door being pivotable between an open position exposing said opening and a closed position where a portion of said door outside said enclosure substantially covers said opening.

2. The electronic device claimed in claim 1, wherein:
   said bezel comprises an electrically conductive material;
   said door comprises an electrically conductive material; and
   said door makes electrical contact with said bezel at least when said door is closed.

3. The electronic device claimed in claim 2, wherein said door has a height between first and second ends along a third axis perpendicular to said first and second axes and has a width between third and fourth ends along said second axis, said first end of said door including hinge pins or hinge pin retention features.

4. The electronic device claimed in claim 3, wherein said third and fourth ends of said door include a plurality of fingers that make electrical contact with said bezel when said door is closed.

5. The electronic device claimed in claim 4, wherein said plurality of fingers are positioned to guide a removable transceiver module when said door is open.

6. The electronic device claimed in claim 3, wherein first end of said door includes a tab that makes electrical contact with said bezel when said door is closed.

7. The electronic device claimed in claim 6, wherein said tab is resilient and spring biases said door toward said open position when said door is closed.

8. The electronic device claimed in claim 7, wherein said tab includes a plurality of dimples that make electrical contact with said bezel when said door is open.

9. The electronic device claimed in claim 2, wherein said door makes electrical contact with said bezel when said door is open.

10. The electronic device claimed in claim 7, wherein said guide member comprises a metal strip extending along said guide member, said metal strip having an end at said second end of said guide member in electrical contact with said tab when said door is closed.

11. The electronic device claimed in claim 3, wherein said door is spring biased toward said open position when said door is closed.

12. The electronic device claimed in claim 11, wherein said second end of said door includes a door latch that cooperates with an edge of said opening in said bezel to latch said door in said closed position.

13. The electronic device claimed in claim 11, wherein said bezel includes a door latch that cooperates with said second end of said door to latch said door in said closed position.

14. The electronic device claimed in claim 1, wherein said guide member has a surface that is substantially coplanar with a surface of said door when said door is in said open position, and said guide member having a stop member that abuts against a stop member of said door when said door is in said open position.

15. The electronic device claimed in claim 14, wherein said guide member has a guide rail formed therein that is aligned with a guide rail on said door when said door is in said open position.

16. The electronic device claimed in claim 15, wherein said guide rail on said door includes a late engagement feature that engages a flange on a removable transceiver module when insertion of said removable transceiver module into said opening is complete.

17. The electronic device claimed in claim 15, wherein said surface of said door has a recess mateable with a correspondingly shaped latch member of a removable transceiver module when insertion of said removable transceiver module into said opening is complete.

18. The electronic device claimed in claim 1, wherein said door is removably engageable with said second end of said guide member, said door removable from engagement with said guide member in response to a force experienced by said door.

19. The electronic device claimed in claim 16, wherein said engagement is a snap engagement.

20. The electronic device claimed in claim 17, wherein one of said door and said guide member has a pair of hinge pins extending along said second axis, and the other has a pair of hinge pin retention features mateable with said pair of hinge pins, and said pair of hinge pins snap into said pair of hinge pin retention features to define said snap engagement.

21. The electronic device claimed in claim 1, wherein:
   said electrical connector has an upper surface and a lower surface oriented in opposed relation along a third axis perpendicular to said first and second axes, and each electrical contact has an upper portion at said upper surface of said electrical connector for electrically connecting with another electrical connector of a removable transceiver module and a lower portion at said lower surface of said connector for surface-mounting to contact pads of a printed circuit card; and
   said connector block has a camming element that, in response to a force experienced by said camming element along said first axis, redirects said force in a direction having a component along said third axis and toward said lower surface.

22. A connector system, comprising:
   an enclosure having a bezel that has an opening;
   a circuit board mounted within said enclosure;
   a first electrical connector, comprising:
      a guide member mounted on said circuit board and elongated between first and second ends along a first axis;

a connector block at said first end of said guide member;

a plurality of electrical contacts retained in said connector block; and a door pivotally mounted at said second end of said guide member, said door being pivotable between an open position exposing said opening and a closed position where a portion of said door outside said enclosure substantially covers said opening; and a module, comprising:

a body slidably engageable with said guide member of said first electrical connector in a direction along said first axis; and a plurality of electrical contacts engageable with said plurality of electrical contacts of said first electrical connector.

23. The connector system claimed in claim 20, wherein said module is an optoelectronic transceiver module.

24. The connector system claimed in claim 20, wherein:

said bezel comprises an electrically conductive material;

said door comprises an electrically conductive material; and said door makes electrical contact with said bezel at least when said door is closed.

25. The electronic device claimed in claim 24, wherein said door is spring biased toward said open position when said door is closed.

26. The electronic device claimed in claim 25, wherein said second end of said door includes a door latch that cooperates with an edge of said opening in said bezel to latch said door in said closed position.

27. The electronic device claimed in claim 25, wherein said bezel includes a door latch that cooperates with said second end of said door to latch said door in said closed position.

* * * * *